US012712270B2

(12) United States Patent
Samardzija et al.

(10) Patent No.: US 12,712,270 B2
(45) Date of Patent: Aug. 18, 2026

(54) MULTIPLE PIFA/IFA TYPE ANTENNAS OPERATING AT THE SAME FREQUENCY INCLUDING SHORT PINS TO MINIMIZE ANTENNA SEPARATION

(71) Applicant: Plume Design, Inc., Palo Alto, CA (US)

(72) Inventors: Miroslav Samardzija, Mountain View, CA (US); Cosan Caglayan, San Mateo, CA (US); Isaac Wang, Taoyuan City (TW); Liem Hieu Dinh Vo, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 101 days.

(21) Appl. No.: 17/977,441

(22) Filed: Oct. 31, 2022

(65) Prior Publication Data

US 2024/0145922 A1 May 2, 2024

(51) Int. Cl.
*H01Q 9/04* (2006.01)
*H04B 7/0413* (2017.01)

(52) U.S. Cl.
CPC ......... *H01Q 9/0414* (2013.01); *H04B 7/0413* (2013.01)

(58) Field of Classification Search
CPC ... H01Q 9/0414; H04B 7/0413; H05K 1/0222
See application file for complete search history.

(56) References Cited

U.S. PATENT DOCUMENTS 6,366,243 B1 * 4/2002 Isohatala ................ H01Q 5/364 343/702
6,853,197 B1 2/2005 McFarland et al.
6,961,545 B2 11/2005 Tehrani et al.
7,245,882 B1 7/2007 McFarland (Continued)

OTHER PUBLICATIONS

Chattha, Hassan & Huang, Yi & lu, Yang. (2009). PIFA Bandwidth Enhancement by Changing the Widths of Feed and Shorting Plates. Antennas and Wireless Propagation Letters, IEEE. 8. 637-640 (Year: 2009).*

(Continued)

*Primary Examiner* — Dimary S Lopez Cruz
*Assistant Examiner* — Austin M Back
(74) *Attorney, Agent, or Firm* — Nicholas Martin; Greenberg Traurig, LLP

(57) ABSTRACT

An antenna system includes a plurality of PIFA/IFA type wherein each of the plurality of antennas have either a same short pin or different short pins located together to minimize antenna separation between the plurality of antennas. The antennas share the same short pin with the width between at least two antennas of the plurality of antennas designed to minimize coupling when the at least two antennas operate at a same frequency. The short pin width is at least λ/8 where λ is based on a lowest frequency of operation of the antenna system, the lowest frequency of operation is about 2.4 GHz. The common short pin also includes a minimum distance to the associated antenna feed. Where the different short pins are located together the antenna includes a first short pin as a cylinder and a second short pin located within the cylinder without contact therebetween.

18 Claims, 18 Drawing Sheets

(56) References Cited

U.S. PATENT DOCUMENTS

| | | | | |
|---|---|---|---|---|
| 7,245,893 | B1 | 7/2007 | Husted et al. | |
| 7,251,459 | B2 | 7/2007 | McFarland et al. | |
| 9,136,937 | B1 | 9/2015 | Cheng et al. | |
| 9,160,584 | B1 | 10/2015 | Kavousian et al. | |
| 10,616,904 | B1 * | 4/2020 | Mirkamali | H01Q 21/10 |
| 2004/0196122 | A1 * | 10/2004 | Fisher | H01P 5/184 333/246 |
| 2013/0090057 | A1 | 4/2013 | Green et al. | |
| 2013/0293424 | A1 | 11/2013 | Zhu et al. | |
| 2014/0009344 | A1 | 1/2014 | Zhu et al. | |
| 2014/0009355 | A1 | 1/2014 | Samardzija et al. | |
| 2014/0112511 | A1 | 4/2014 | Corbin et al. | |
| 2014/0226572 | A1 | 8/2014 | Thota et al. | |
| 2014/0340265 | A1 | 11/2014 | Vazquez et al. | |
| 2015/0099474 | A1 | 4/2015 | Yarga et al. | |
| 2015/0109167 | A1 | 4/2015 | Yarga et al. | |
| 2015/0195836 | A1 | 7/2015 | Malkin et al. | |
| 2015/0302976 | A1 | 10/2015 | Chang et al. | |
| 2015/0303568 | A1 | 10/2015 | Yarga et al. | |
| 2015/0311579 | A1 * | 10/2015 | Irci | H01Q 13/10 343/702 |
| 2015/0311960 | A1 | 10/2015 | Samardzija et al. | |
| 2016/0056526 | A1 | 2/2016 | Li et al. | |
| 2016/0336643 | A1 | 11/2016 | Pascolini et al. | |
| 2017/0062906 | A1 * | 3/2017 | McAuliffe | H01Q 9/04 |
| 2018/0108984 | A1 | 4/2018 | Wu et al. | |
| 2018/0239308 | A1 * | 8/2018 | Yamamoto | G04R 60/10 |
| 2018/0342784 | A1 | 11/2018 | Samardzija et al. | |
| 2019/0020713 | A1 * | 1/2019 | Hulick | H01Q 9/42 |
| 2019/0207301 | A1 * | 7/2019 | Shimura | H01Q 5/378 |
| 2020/0358196 | A1 | 11/2020 | Samardzija et al. | |
| 2020/0365974 | A1 * | 11/2020 | Wei | H01Q 9/42 |
| 2021/0075106 | A1 | 3/2021 | Samardzija et al. | |
| 2021/0084745 | A1 * | 3/2021 | Kim | H01L 23/40 |
| 2021/0210868 | A1 | 7/2021 | Avser et al. | |
| 2023/0058737 | A1 * | 2/2023 | Ling | H01Q 1/243 |

OTHER PUBLICATIONS

International Search Report and Written Opinion to corresponding International Application No. PCT/US23/77695 mailed Mar. 11, 2024 (10 pages).

* cited by examiner

300

1200

1500

MULTIPLE PIFA/IFA TYPE ANTENNAS OPERATING AT THE SAME FREQUENCY INCLUDING SHORT PINS TO MINIMIZE ANTENNA SEPARATION

FIELD OF THE DISCLOSURE

The present disclosure generally relates to antenna systems and methods. More specifically, the present disclosure relates to multiple Inverted-F (IFA)/Planar Inverted-F (PIFA) type antennas operating at the same frequency including short pins connected or located at the same location to minimize antenna separation.

BACKGROUND OF THE DISCLOSURE

Various devices utilize antennas for wireless communication, such as wireless Access Points (APs), streaming media devices, laptops, tablets, and the like (collectively "wireless devices"). Recently, the demand for antennas for mobile wireless applications has increased dramatically, this is driven in part by the Internet of Things (IoT) market. IoT devices include sensors, processing ability, and software applications that connect and exchange data with other devices over the internet or other similar communication networks. Every IoT device requires at least one antenna, and since IoT devices are expected to operate with many different devices at many different frequency bands, IoT devices can include multiple antennas in one small form device.

When two or more antennas are designed in close proximity to one another coupling between the multiple antennas becomes one of the most important design metrics. Coupling describes when radiation is absorbed by one antenna receiver when another nearby antenna is operating. Coupling occurs when two or more antennas are placed in such close physical proximity to one another that the radiation is unintendedly absorbed by the antenna close to the transmitting antenna. Low coupling (high isolation) is desired to not degrade antenna efficiency, diversity, and/or Multiple-Input Multiple-Output (MIMO). Antenna diversity is a wireless scheme that uses two or more antennas to improve the quality and reliability of a wireless link. MIMO is a method for multiplying the capacity of a radio link by using multiple transmission and receiving antennas to transfer data at the same time utilizing the same frequency band. Both diversity and MIMO require high isolation and are standard protocols in Wi-Fi and cellular technologies. It should be noted that antenna elements must be physically dimensioned to match the operating wavelength, and antenna size is inversely proportional to frequency, therefore the lower the operational frequency the larger the antenna that is required to operate at that frequency.

Typical Wi-Fi frequency bands are 2.4 GHz and 5 GHz, in comparison cellular LTE AT&T Band 17 and Verizon Ban 13 both operate in the 700 MHz range. A new emerging Wi-Fi frequency band of 6 GHz is being developed and deployed in wireless devices as it provides more bandwidth and less interference for Wi-Fi communication. Some common protocols used in the 2.4 GHz Wi-Fi frequency band includes Bluetooth, Zigbee, and Matter. Matter is new in the industry and is being developed to create a standard communication platform for smart devices to interface with one another. As antennas are being employed in more compact forms with reduced physical separation, the need for high isolation between the two or more antennas radiating elements as well as limiting the overall length and height of the antenna system is necessary. Many different types of resonant antennas exist including but not limited to dipole, monopole, array, and loop. Monopole antennas are half the size of dipole antennas and are commonly a straight antenna that is mounted perpendicular to a ground plane. Quarter wavelength ($\lambda/4$) antennas are commonly used in small form devices as the antenna is much smaller but also provides better transmission and reception efficiency compared to the half or full wavelength antennas. A ground plane is included to combine with the antenna to form a complete resonant circuit at the desired operational frequency, where the ground plane is used as the return path for currents. Quarter wavelength antennas require special attention to antenna length, antenna feed, and the shape and size of the ground plane and return path. When implemented into a small form device these parameters are of great significance.

A single IoT (wireless device) is expected to include multiple antennas operating at different frequencies and MIMO antennas operating at the same frequency band. Antenna design and implementation techniques need to allow smaller footprint antennas operating at the same and different frequencies to be deployed while also maintaining the required amount of separation between antennas that is needed to have low coupling (high isolation). As more antennas are deployed in wireless devices the need for antennas that require small volume becomes a critical design and implementation challenge.

BRIEF SUMMARY OF THE DISCLOSURE

The present disclosure includes multiple Inverted-F (IFA)/Planar Inverted-F (PIFA) antennas wherein each antenna shares a common short pin or different short pins at the same location but are designed and implemented to minimize antenna separation between the antennas while also reducing coupling.

In an embodiment, an antenna system includes a plurality of antennas, each being one of an inverted-F antenna (IFA) type and a planar inverted-F antenna (PIFA) type; wherein each of the plurality of antennas have either a same short pin or different short pins located together, to minimize antenna separation between the plurality of antennas. The plurality of antennas can share the same short pin. The same short pin can have a width between at least two antennas of the plurality of antennas to minimize coupling when the at least two antennas operate at a same frequency. The same short pin can have a width of at least $\lambda/8$ where $\lambda$ is based on a lowest frequency of operation of the antenna system. The lowest frequency of operation can be about 2.4 GHz. The same short pin can include a minimum distance to associated antenna feeds of the plurality of antennas. The minimum distance can be about at least $\lambda/10$ where $\lambda$ is based on a lowest frequency of operation of the antenna system.

The same short pin can have a width between at least two antennas and a minimum distance to associated antenna feeds of the plurality of antennas, such that the width and the minimum distance are based on $\lambda$ that is based on a lowest frequency of operation of the antenna system. The plurality of antennas can be on a dielectric carrier and $\lambda$ is adjusted based thereon. The dielectric carrier can be located on a heatsink of an electronic device. The plurality of antennas can include three antennas, A1, A2, and A3, each sharing the same short pin. The same short pin can have a width between A1, A2 and a minimum distance to associated antenna feeds of the plurality of antennas, such that the width and the minimum distance are based on $\lambda$ that is based on a lowest frequency of operation of the antenna system.

The same short pin can be grounded to one of a printed circuit board (PCB) ground and a heatsink via a screw. The different short pins can include a first short pin as a cylinder and a second short pin located within the cylinder without contact therebetween. The cylinder can be a screw boss and the second short pin includes screw threads of a screw that does not connect to the screw boss. The plurality of antennas can support any of 2.4 GHz, 5 GHz, and 6 GHz operation. The any of 2.4 GHz, 5 GHz, and 6 GHz operation can be multiple input-multiple output (MIMO). One or more of the plurality of antennas can include effective lengths supporting two or more frequency bands.

In another embodiment, a method includes providing a plurality of antennas, each being one of an inverted-F antenna (IFA) type and a planar inverted-F antenna (PIFA) type; and providing either a same short pin or different short pins located together for the plurality of antennas have, to minimize antenna separation between the plurality of antennas.

In a further embodiment, a compact electronic device includes a compact housing; circuitry in the compact housing; and a plurality of antennas communicatively coupled to the circuitry, each being one of an inverted-F antenna (IFA) type and a planar inverted-F antenna (PIFA) type; wherein each of the plurality of antennas have either a same short pin or different short pins located together, to minimize antenna separation between the plurality of antennas, in the compact housing.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to antenna systems and methods. More specifically, the present disclosure relates to multiple Inverted-F (IFA)/Planar Inverted-F (PIFA) type antennas operating at the same frequency including short pins connected or located in the same location to minimize antenna separation.

Antenna Circuit Types and Arrangements

Figure 1:
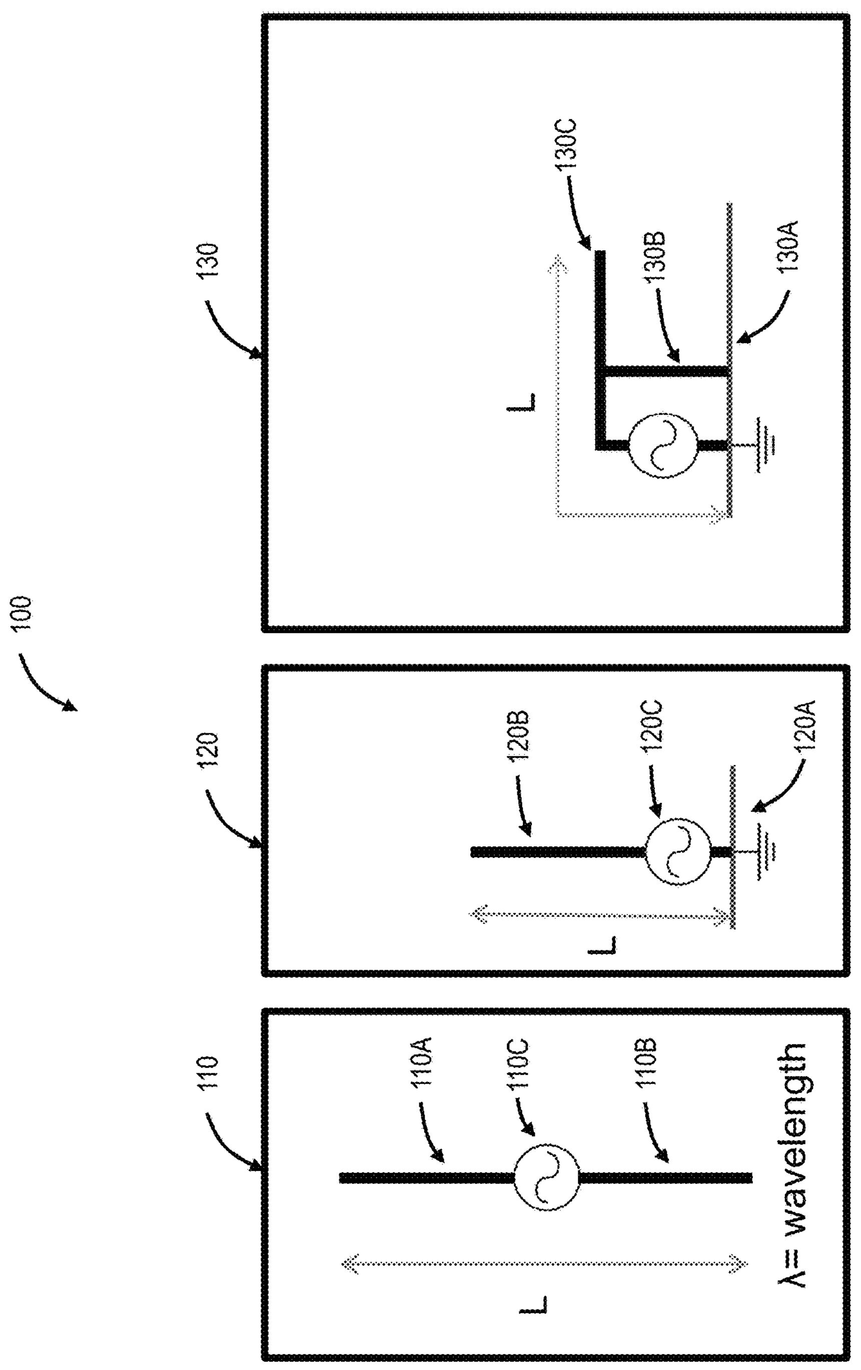
FIG. 1 is a schematic diagram depicting the typical antenna types that are implemented into wireless devices.

FIG. 1 is a schematic diagram depicting the typical antenna types that are implemented into wireless devices. A dipole 110 is the simplest type of antenna and consists of a radiating element (a conductor), a feed, and a matching network. A half-wave dipole (110) commonly consists of two conductors (110A,110B) of equal length, oriented end to end with the feed (110C) connected between them. A half wave dipole antenna is depicted in 110 wherein the length of the antenna is shown as 'L' and is determined by the intended wavelength or frequency of operation. The length 'L' is equal to half the wavelength wherein the wavelength $\lambda=c/f$ (where c is the speed of light, f is the frequency). The half-wave dipole provides many advantages included input impedance insensitivity, length 'L' is not excessively long, and it matches well with transmission line impedance.

The circuit diagram 120 depicts a monopole antenna having $\lambda/4$ length 'L' and includes a common ground plane 120A where the ground plane acts to reflect the radio waves and represent a resonant circuit. The monopole antenna is a class of radio antenna consisting of a straight conductor 120B often mounted perpendicular over a ground plane 120A as shown. The monopole antenna is a dipole antenna 110 where one side of the radiating element (conductor) is replaced with a ground plane 120A. The ground plane 120A size influences the gain, resonance frequency, and impedance of the antenna. The ground plane 120A is typically a flat horizontal conducting service arranged perpendicular to the monopole antenna and is typically connected to electrical ground. The antenna feed 120C represent the components which connect the transmitter and/or receiver with the antenna and are located between the lower end of the monopole and the ground plane 120A. The function and performance of the monopole 120 is similar to the dipole 110.

The circuit diagram 130 is a typical circuit diagram of an Inverted F/Planar Inverted F antenna (IFA/PIFA). It should be noted that detailed aspects of these antenna types may be omitted from this illustration as it is intended to depict the antenna arrangement. IFA/PIFAs consist of a monopole antenna running parallel to a ground plane 130A, grounded at one end in the shape of an inverted F, with a Length 'L' of λ/4. The IFA/PIFA antenna arrangement includes a bent antenna which capacitively couples to the ground plane. The typical matching network of an IFA/PIFA may in full or in part consist of a conducting element that connects the radiating element to the ground therefore a shorting connection (also referred to as short pin, antenna short, or short) is included between the antenna and ground (130B) which acts as a parallel inductance. The short pin is used as a shunt inductance to counteract the parasitic capacitance (shunt capacitance) that is formed between the antenna radiating element 130C and ground plane 130A. The short pin can be implemented into the antenna as a conductor, a screw, a copper tape, a PCB trace, etc. The IFA/PIFA antenna type 130 allows a reduced antenna pair height advantage over the monopole configuration 120. The IFA/PIFA antenna length is the same as the monopole (L=λ/4) however arranged such that the antenna height in relation to the ground plane is much shorter than the monopole antenna 120. As such, the IFA/PIFAs also have a reduced antenna pair area (antenna pair height×antenna pair length) when compared to the two-monopole configuration. The IFA/PIFA configuration has the advantage of having a reduced antenna pair height and antenna pair area but has the disadvantage of having an increased antenna pair length compared to the two-monopole antenna type. The challenge that is realized when designing a multi-antenna system in a small form factor is two-fold:

a. The need to reduce the antenna separation in order to place the multi-antenna system in a small form without degrading high isolation (low coupling) between the antennas.
b. Reduce the overall antenna pair length and antenna pair area in order to accommodate the small form.

Figure 2:
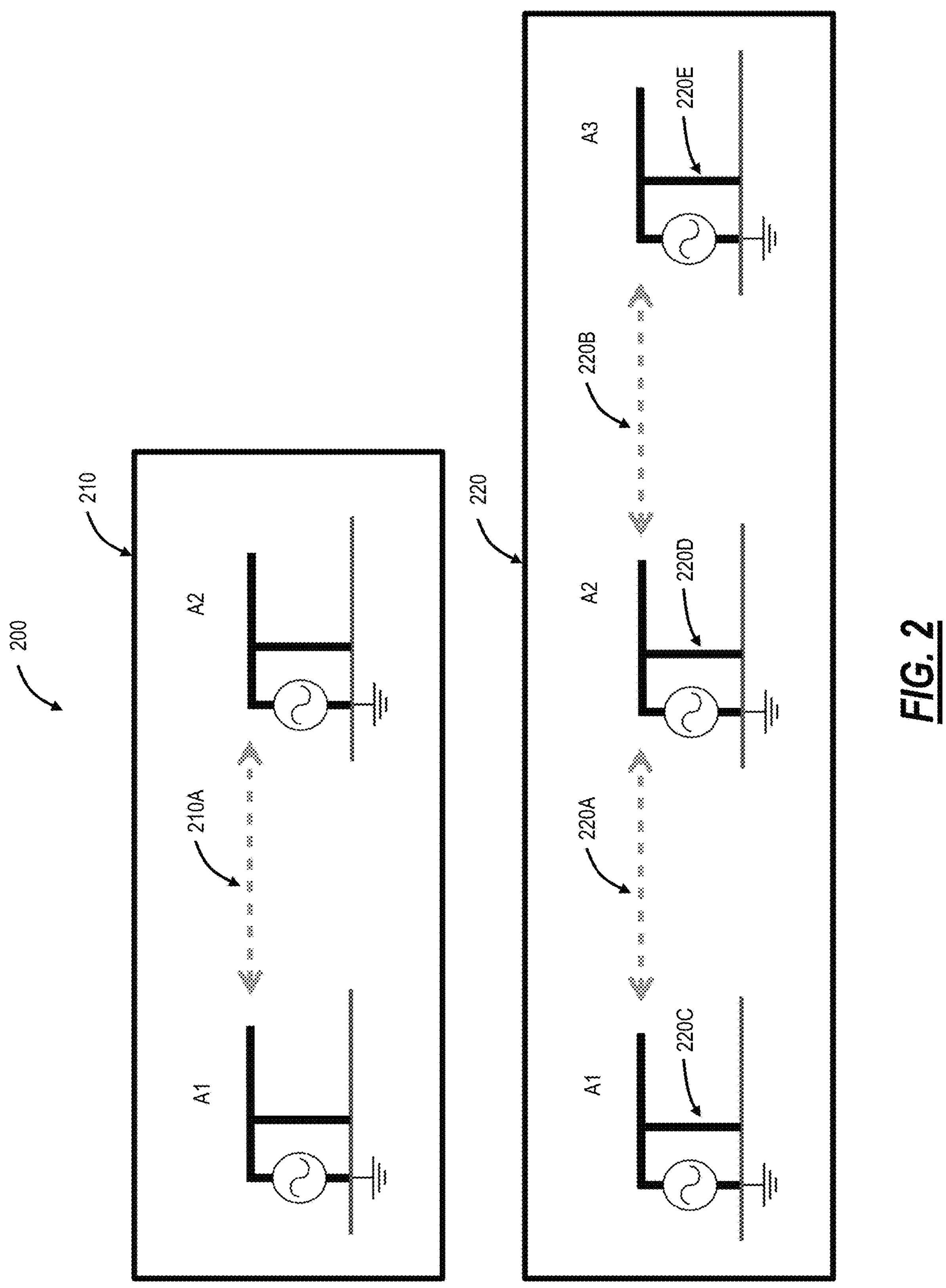
FIG. 2 depicts circuit diagrams for typical IFA/PIFA MIMO antennas operating at 2.4 GHz Wi-Fi.

FIG. 2 shows circuit diagrams for IFA/PIFA Multiple-Input Multiple-Output (MIMO) antennas operating at 2.4 GHz Wi-Fi (this diagram is also valid for other frequencies such as 5 GHz, 700 MHz, etc. Here 2.4 GHz is taken as an example and also implemented). MIMO is a method for multiplying the capacity of a radio link by using multiple transmission and receiving antennas to transfer data at the same time at the same operating frequency (multiple RF chains or streams). The circuit diagrams shown are an example of a multi-antenna design that can be described in more detail as consisting of multiple IFA/PIFA antennas (210, 220) where the antennas have λ/4 length and includes a common ground plane where the ground plane acts to reflect the radio waves and represent a resonant circuit. Represented in 210 is a 2×2 MIMO 2.4 GHz Wi-Fi antenna arrangement where the two IFA/PIFA antennas operate simultaneously at the same frequency to support two RF chains (streams). Coupling describes when radiation is absorbed by one antenna receiver when another nearby antenna is operating. Coupling occurs when two or more antennas are placed in such close physical proximity to one another that the radiation is unintendedly absorbed by the antenna close to the transmitting antenna. Low coupling (high isolation) is desired to not degrade Multiple-Input Multiple-Output (MIMO). The antenna separation 210A can be modified to reduce the effects of coupling on the antennas. The challenge is reducing the antenna separation 210A to place the multi-antenna system in a small form without degrading high isolation (low coupling) between the antennas. Note, those skilled in the art will recognize that the antennas and grounds are shown in straight lines on a 2-dimensional plane, however different configurations, arrangements, thicknesses, and shapes can be used for antenna design and implementation that is represented here as straight lines.

Represented in 220 is a 3×3 MIMO 2.4 GHz Wi-Fi antenna arrangement where the three IFA/PIFA antennas operate simultaneously at the same frequency to support three RF chains (streams). The antenna separations 220A and 220B are used to result in sufficient isolation in the same way as described for the 2×2 configuration (210). Similarly, 4×4 or 5×5, 6×6, etc. MIMO antenna arrangements would require similar antenna separations, and as more antennas are added to support multiple transmissions (streams) the overall antenna footprint becomes large, and the small form wireless device available volume gets consumed by the antennas.

Typically, the multiple antennas need to have an antenna separation of approximately λ/2 to provide sufficient high isolation and low coupling. Isolation is a metric that measures the ability of one antenna to operate without or with minimal influence from the other. There are several methods of reducing this antenna separation, however the antenna separation (210A, 220A, 220B) is a significant portion of the wavelength (λ).

Common Short Pin Design for Multiple IFA/PIFA Antennas

Figure 3:
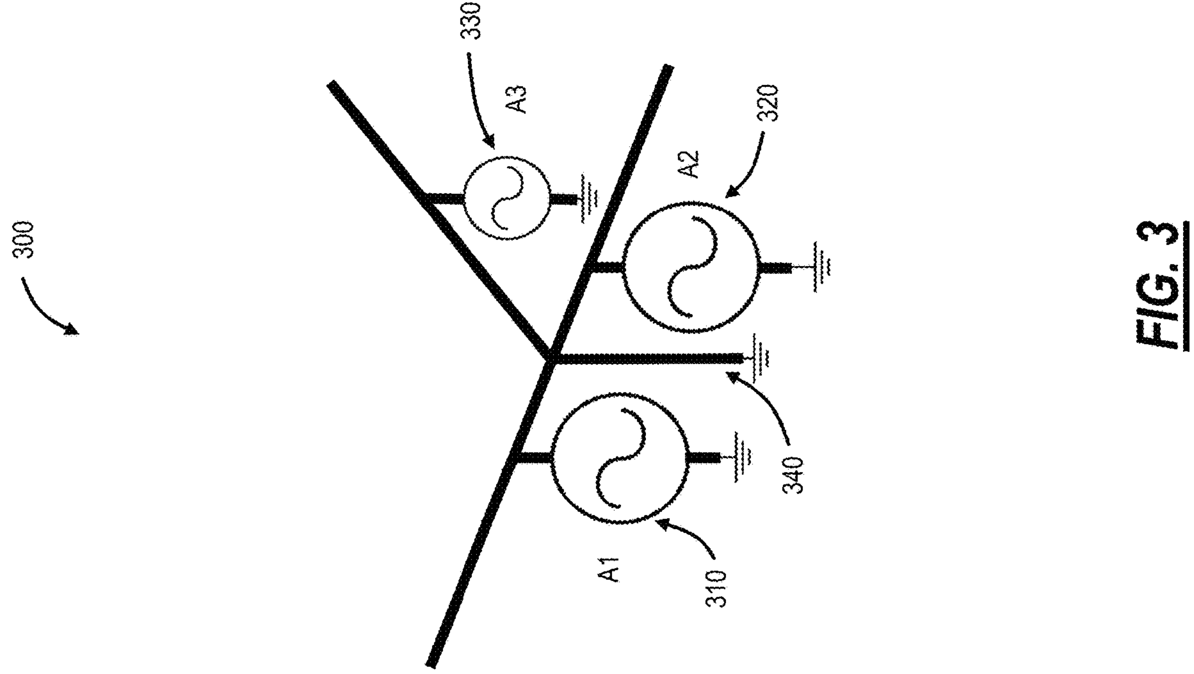
FIG. 3 depicts a circuit diagram for an IFA/PIFA MIMO antenna configuration with no antenna separation utilizing a common short pin.

FIG. 3 depicts a circuit diagram for a 3×3 IFA/PIFA MIMO antenna configuration with the no antenna separation 300. As shown in 220 the traditional 3×3 IFA/PIFA arrangement operating simultaneously at the same frequency requires antenna separation to provide high isolation and low coupling. By arranging those 3×3 MIMO antennas where the short pins (220C, 220D, 220E) for each IFA/PIFA antenna are joined together a common short pin is created (340). This common short pin 340 is accomplished considering that each antenna is very similar to one another, and the short pin is predominantly used for antenna matching and not radiation. By creating this common short pin, the antenna separation is no longer required, and the multiple antennas can take up less volume inside the small form wireless device. The antennas can still support the 2.4 GHz frequency band that is used by Bluetooth, Wi-Fi, and Matter protocols. The consequence of this common short pin is that coupling will occur between the antennas, therefore a solution is needed for providing the necessary isolation. The key in designing antennas in this configuration is to design a short pin that each antenna can use in a way that coupling does not occur between the antennas. The antennas A1, A2, and A3 feeds are shown (310, 320, 330) respectively and the short pins are joined into a common short 340 and all antennas share the same ground plane.

It should be noted that the coupling occurs most often when multiple antennas are operating at the same frequency. The individual antennas can be operating simultaneously at the same frequency such as at the 2.4 GHz band but can also be operating simultaneously at different frequencies such as a combination of 2.4 GHz and 5 GHz, 2.4 GHz and 6 GHz, or 5 GHz and 6 GHz, for example. The antennas may be operating on the same frequency band and at same frequencies such as one antenna operating with Bluetooth, a second antenna operating with Matter, and a third with Wi-Fi. It should also be noted that a 3×3 MIMO is shown in 300, however this configuration can apply to a 2×2 MIMO, 4×4 MIMO, etc. Note, those skilled in the art will recognize that the antennas and grounds are shown in straight lines on a 2-dimensional plane, however different configurations, arrangements, thicknesses, and shapes can be used for antenna design and implementation that is represented here as straight lines.

Figure 4:
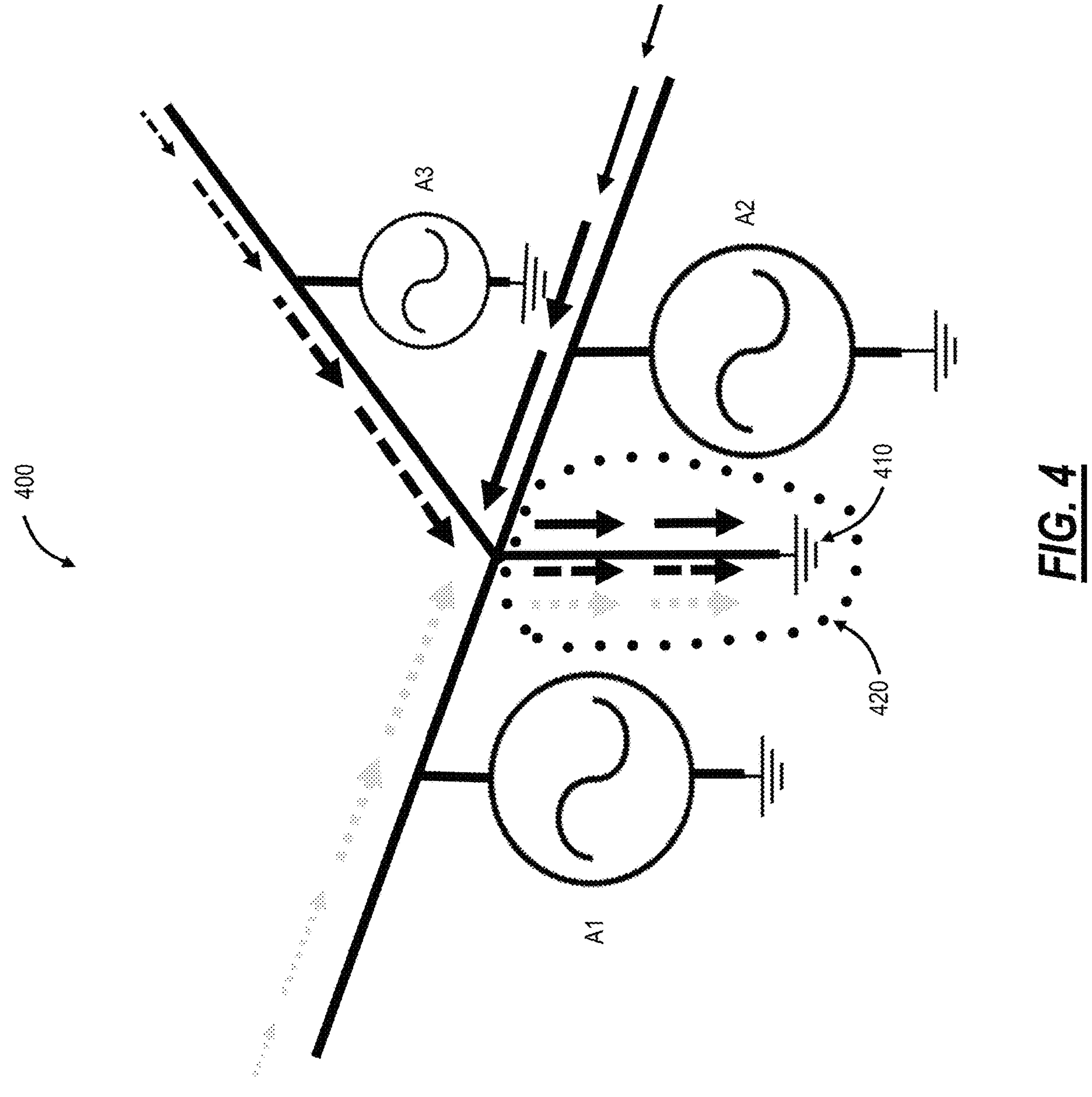
FIG. 4 depicts a circuit diagram of the common short pin IFA/PIFA circuit illustrating current flow along the common short pin IFA/PIFA circuit.

FIG. 4 depicts currents flowing along the common short pin IFA/PIFA circuit. The individual antennas are shown as A1, A2, and A3 where the antenna currents are shown directionally with arrows (short dashed arrows for A1 currents, solid arrows for A2 currents, long dashed arrows for A3 currents). Considering that the individual antenna short pins are joined into one common short pin 410, the short pin currents will flow on the same conductor in the same direction causing coupling (poor isolation). The currents are flowing in the same direction on the same conductor (common short pin) thereby creating common mode current where the currents are unmatched with opposite currents of similar magnitude and will result in the poorest isolation and highest coupling as illustrated in the dotted circle (420). The desired current flow would be in the opposite direction creating a differential mode current and resulting in the best isolation and thereby lowest coupling. The common short pin antenna arrangement needs to be designed to avoid multiple antennas having currents flowing in the same direction (common mode current). It would also be ideal if the currents shown flowing in the same direction (common mode) in the common short pin can be designed to be out of band (below 2.4 GHz) as common mode currents that are out of the operating band of the antennas will not cause interference.

Figure 5:
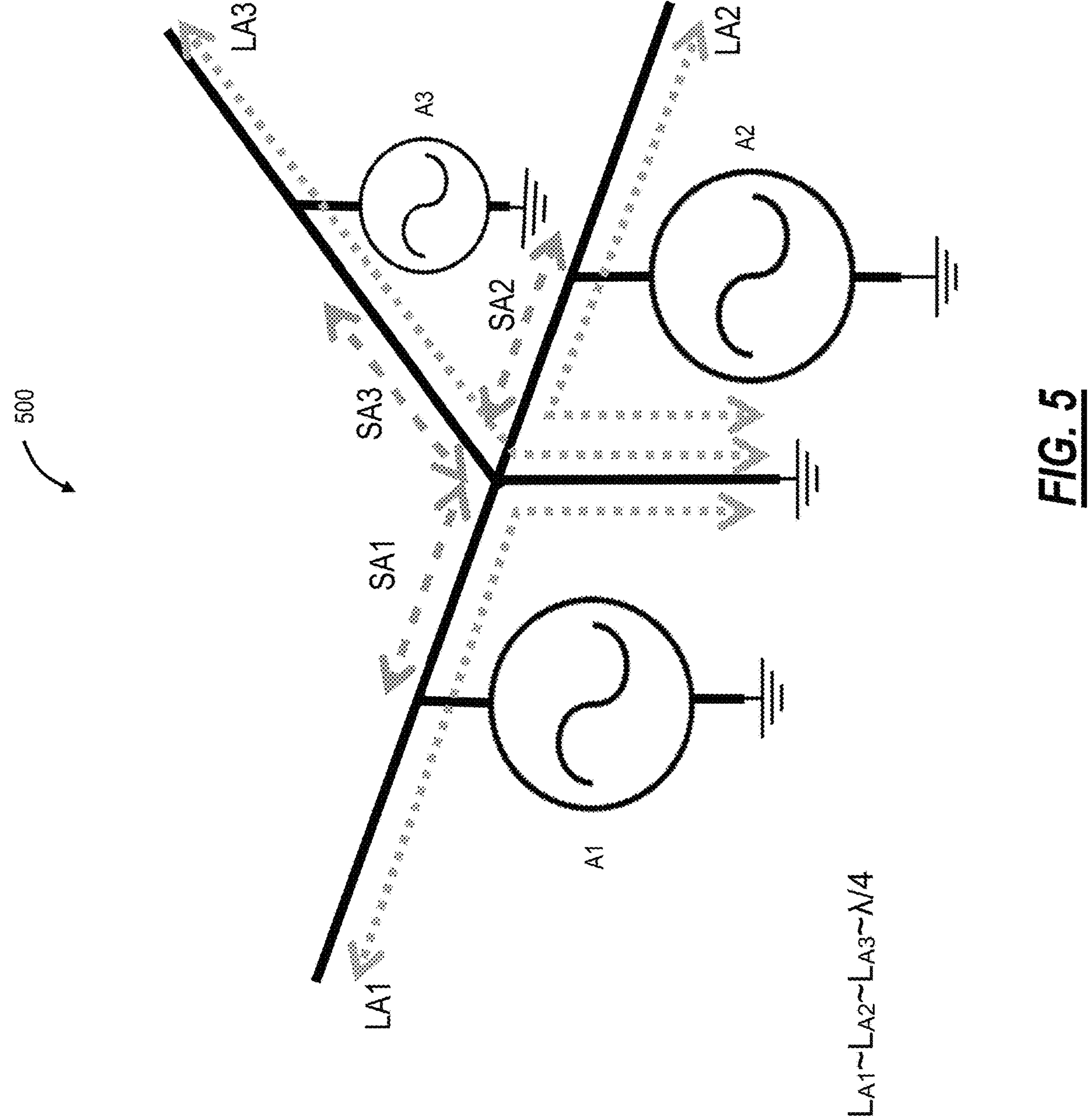
FIG. 5 is a circuit diagram of the common short pin IFA/PIFA circuit with circuit enhancements to reduce coupling.

FIG. 5 is a circuit diagram of the common short pin IFA/PIFA circuit with circuit enhancements to reduce coupling. As described in 130 the IFA/PIFA individual antenna length is a fixed value $L=\lambda/4$. The individual antenna lengths for Antenna A1, Antenna A2 and Antenna A3 are represented by dotted arrow lines $LA_1$, $LA_2$, and $LA_3$ respectively (500). The antenna lengths are a fixed value based on the desired operating wavelength (frequency). To enhance isolation in this common short pin configuration it was determined that the antennas need to be designed and implemented to set the distance from the center of the short pin to the antenna feeds equal to approximately at least $\lambda/8$. Another constraint to this antenna design is the width of the short pin must be at least $\lambda/10$, the width of the short pin would be represented in this circuit diagram 500 as along the direction of $S_{A1}$ and $S_{A2}$. The wavelengths being described are assuming the antenna is in a free space, if the antenna is implemented on a dielectric material or carrier the dielectric constant would be factored into the conditions described above for enhancing isolation. Where individual antennas can be operating simultaneously at different frequencies such as 2.4 GHz and 5 GHz, the wavelength used for determining the constraints above are taken at the lowest frequency. Since frequency and wavelength are inversely proportional using the lowest frequency gives the longest required distances.

Implementation of Common Short Pin Design for Multiple IFA/PIFA Antennas

Figure 6:
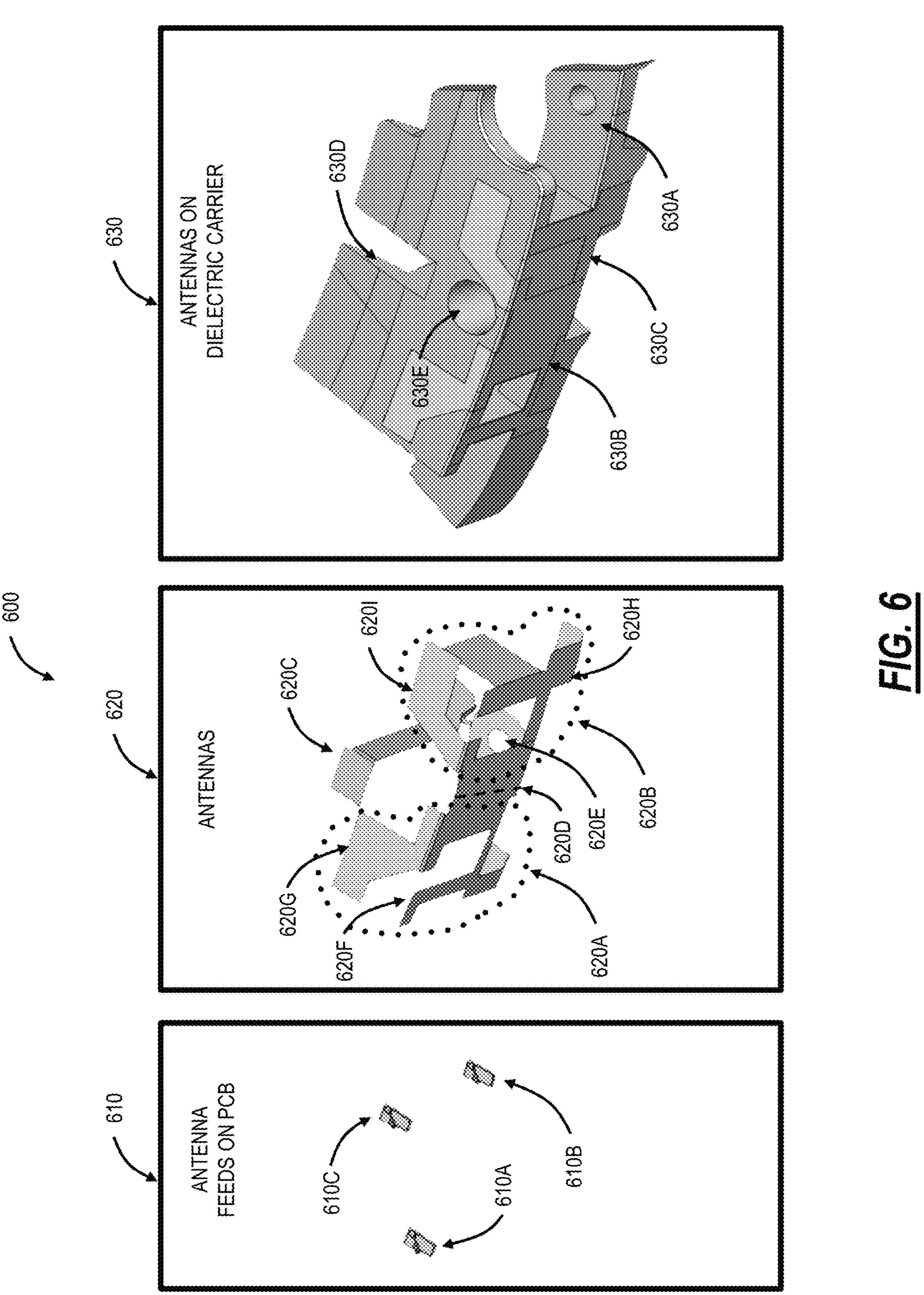
FIG. 6 is an implementation break down illustrating the different components of the common short pin IFA/PIFA antenna configuration.

FIG. 6 is an implementation break down illustrating the different components that comprise the common short pin IFA/PIFA antenna configuration. The antenna feeds are illustrated in 610, wherein A1 feed (610A), A2 feed (610B), and A3 feed (610C) are the same A1, A2, A3 feeds as shown on the circuit diagram 500. The antenna feeds (610A, 610B, 610C) are installed underneath the antenna arrangement and make the electrical connection between the antenna and the radio frequency printed circuit board (RF PCB) wherein the RF PCB sends the signal from the radio to the antenna feeds, and the antenna feeds send the radio signal to the antenna. The three antennas A1 (620A), A2 (620B), and A3 (620C) are depicted in physical form 620 as a Laser Direct Structuring (LDS) type wherein the common short pin 620D is shared between the three antennas. The common short pin width as described in 500 as being at least $\lambda/10$ to reduce coupling is shown with the distance between the dotted circles which represent the A1 antenna 620A and A2 antenna 620B. As illustrated the A3 antenna 620C is connected to the common short pin on the underside near the screw hole 620E. The screw hole 620E in the common short pin is used in concert with a screw to ground the short pin to the PCB ground or wireless device metallic heat sink.

It should be noted that the antenna A1 shown with dotted circle 620A can consist of two different frequency elements such that 620F is a 5 GHz element and 620G is a 2.4 GHz element. Similarly, antenna A2 shown with the dotted circle 620B can consist of two different frequency elements such that 620H is a 5 GHz element and 620I is a 2.4 GHz element. Antenna A3 (620C) can be a 2.4 GHz or 5 GHz element. As described in 500 the conditions for enhancing isolation (reducing coupling) consist of the distance from the center of the short pin 620D to antenna feeds (610A, 610B, 610C) and width of the short pin 620D. The center of the short pin is shown with a dashed line on 620D where the antenna feeds are located on the underside of the antenna arrangement as the antenna rests on the RF PCB.

As shown on 630 the common short pin antenna configuration is imprinted on a dielectric carrier 630A by LDS method. A1 antenna 630B and A2 antenna 630C are shown on the front end of the dielectric carrier and A3 antenna 630D would be positioned on the underside of the carrier and not visually shown on this view. The screw hole on the dielectric carrier 630E aligns with the screw hole in the antenna short pin 620E and allows the screw to ground the short pin to the PCB ground or wireless device metallic heat sink. The dielectric constant is taken into account when calculating the separations and dimensions that aid in reducing coupling between the antennas (common short pin width and distance from center of the common short pin to antenna feeds). As shown in 630 the width of the short pin affects the overall dielectric carrier width so increasing the width of the short pin 620D increases the overall volume inside the small form wireless device. Similarly, increasing the distance from the center of the common short pin to the antenna feeds increases the overall dielectric carrier size and increases the volume in the small form wireless device, therefore achieving the shortest distances while maintaining adequate isolations are preferred.

Figure 7:
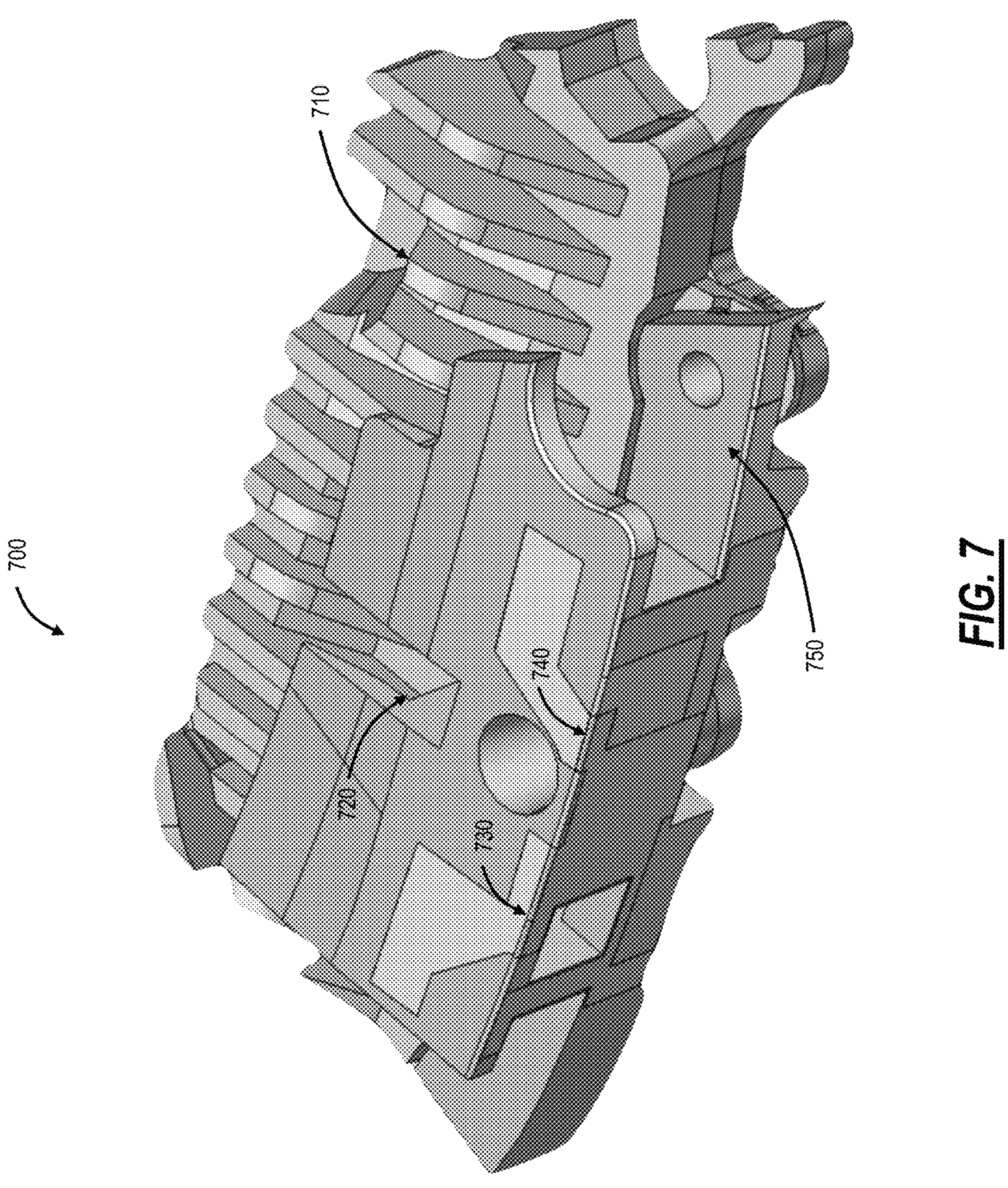
FIG. 7 is an illustration depicting the common short pin IFA/PIFA antenna and dielectric carrier being installed on a component in the small form wireless device.

FIG. 7 is an illustration depicting the common short pin IFA/PIFA antenna and dielectric carrier being installed on a component in the small form wireless device. The dielectric carrier 750 with common short pin antenna configuration can be implemented into the small form wireless device by attaching to a metallic heat sink 710, RF PCB, or another element within the wireless device. The dielectric carrier acts as an insulator between the common short pin antenna configuration and the metallic heat sink/RF PCB. The three antennas are attached to the dielectric carrier with Antenna A1 (730), Antenna A2 (740), Antenna A3 (720), where Antenna A3 720 is on the underside of the top piece of the dielectric carrier and connects to the short pin via the common short pin screw hole not shown in this view.

Figure 8:
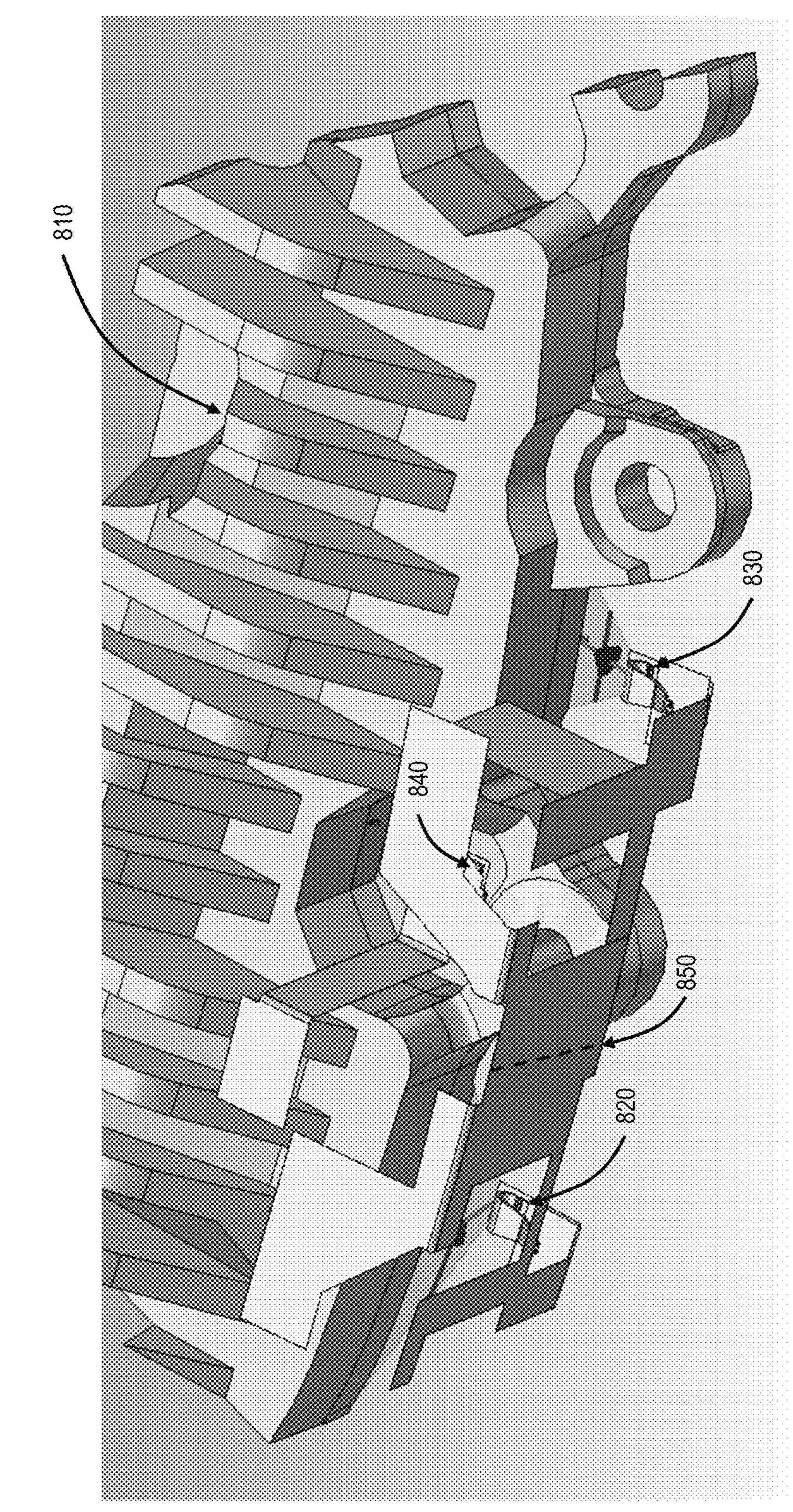
FIG. 8 is an illustration depicting the common short pin IFA/PIFA antenna installed on a component in the small form wireless device with the dielectric carrier omitted.

FIG. 8 is an illustration depicting the common short pin IFA/PIFA antenna installed on a component in the small form wireless device with the dielectric carrier omitted to get a better view of the antenna feeds for the antennas A1, A2, and A3 (730, 740, 750) respectively. This view better illustrates the antenna feeds that were shown individually in 610. The metallic heat sink 810 is shown but the dielectric carrier which provides separation between the antenna arrangement and the metallic heat sink 810 is omitted. In the illustration depicted on 800, the antenna feeds that connect the RF PCB to the antenna are located below the antenna (antenna A1 feed 820, antenna A2 feed 830, and antenna A3 feed 840). As described in 500 one of the conditions for enhancing isolation (reducing coupling) consist of the separation distance from the center of the short pin 850 to the antenna feeds A1, A2, A3 (820, 830, 840).

Figure 9:
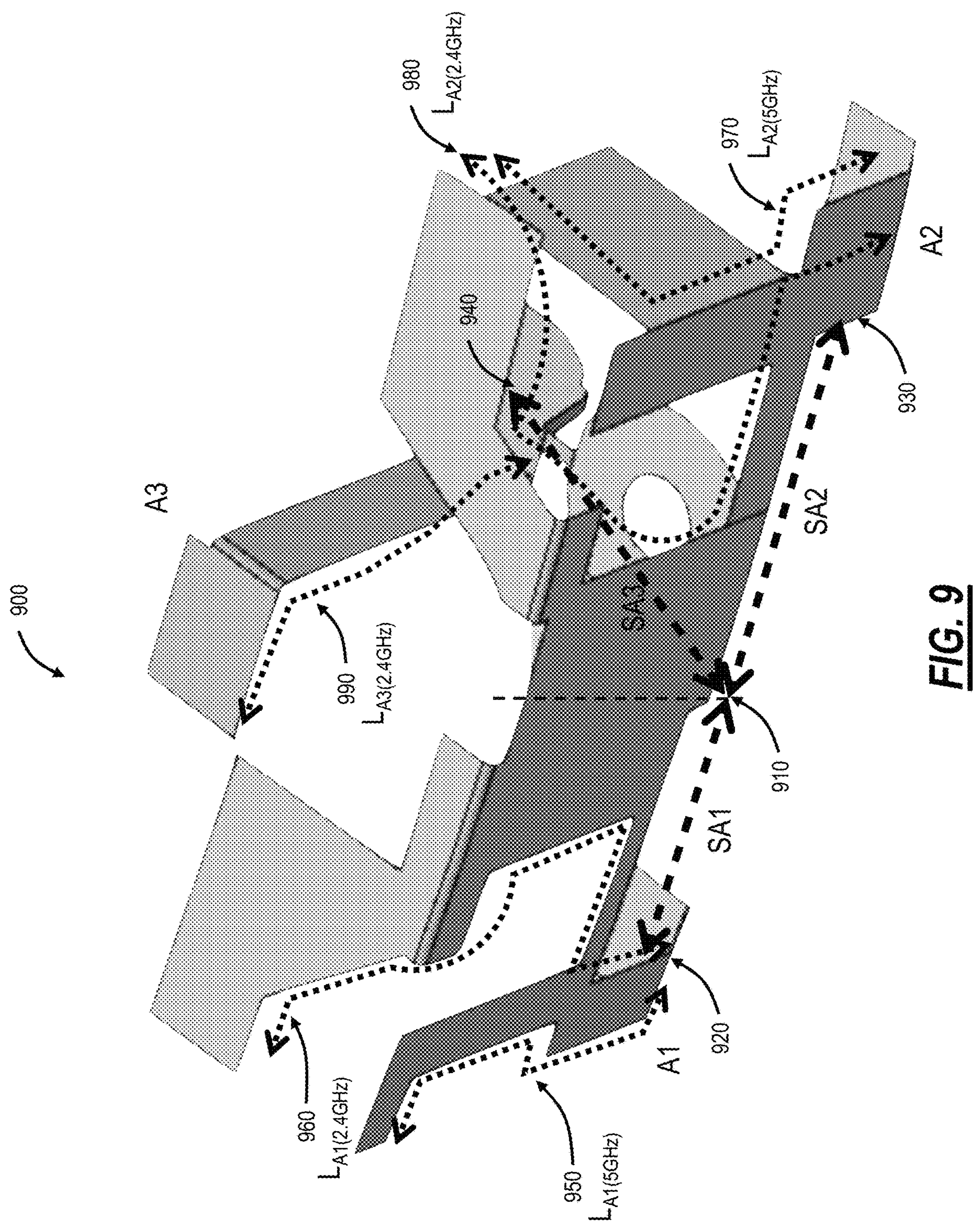
FIG. 9 depicts the common short pin IFA/PIFA antenna physical configuration illustrating the design parameters that affect antenna operation.

FIG. 9 depicts the common short pin IFA/PIFA antenna configuration illustrating the design parameters that affect antenna operation. $SA_1$, $SA_2$, and $SA_3$ are shown on the physical illustration of the antenna 900 the same as they are shown illustrated on the circuit diagram 500. $S_{A1}$ shown as the dotted arrow line represents the distance from the center of the common short pin 910 to the antenna feed A1 (920). The antenna feed A1 is located below the A1 antenna circuit and connects the antenna to the RF PCB, wherein the RF PCB is mounted below the antenna. $S_{A2}$ shown as the dotted arrow line represents the distance from the center of the common short pin 910 to the antenna feed A2 (930). Similar to A1 antenna feed, the A2 antenna feed is located below the A2 antenna circuit and is used to connect the antenna A2 to the RF PCB. $S_{A3}$ shown as the dotted arrow line represents the distance from the center of the common short pin 910 to the antenna feed A3 (940). Similar to A1 and A2 antenna feeds, the A3 antenna feed is located below the A3 antenna circuit and is used to connect the antenna A3 to the RF PCB.

The antennas are designed to set the center of the short pin to the antenna feeds A1 (920), A2 (930), and A3 (940) equal to approximately $\lambda/8$ where $\lambda$ represents the free space wavelength. As described and shown in 700 the antenna is mounted on a dielectric carrier, therefore the effect of the dielectric on the antenna design needs to be taken into consideration using the following equation:

$$SA_1 \sim SA_2 \sim SA_3 \sim \frac{\lambda_d}{8} \quad \text{[Equation 1]}$$

Where, the effective wavelength $$\lambda_d = \frac{\lambda}{\sqrt{\varepsilon_r}}$$

Where, $\varepsilon_r$ is the relative dielectric constant of the LDS carrier 750.

Assuming in this example, the antenna is designed for the 2.4 GHz operating frequency band, $SA_1$, $SA_2$, and $SA_3$ is approximately 9 millimeters (mm) and $\varepsilon_r$ is approximately 2.5.

$LA_1$, $LA_2$, and $LA_3$ are shown on the physical illustration of the antenna 900 same as they are represented on the circuit diagram 500. $LA_1$, $LA_2$, and $LA_3$ are the length of the antenna circuit from radiating element to ground and are all equal to $\lambda_d/4$, which is a fixed value based on the desired operating wavelength (frequency) where $\lambda_d$ represents the effective wavelength with dielectric constant taken into consideration. The frequencies being utilized in this 3×3 MIMO configuration shown in 900 includes 2.4 GHz (Antennas A1, A2, and A3) and 5 GHz (Antennas A1 and A2). $LA_{(2.4\ GHz)}$~21 mm and $LA_{(5\ GHz)}$~11 mm for all antenna circuits utilizing those frequencies. Antennas A1 and A2 are dual band antennas that can operate two simultaneously operating frequencies that support 2.4 GHz path and 5 GHz path. Since A1 and A2 operate as dual band antennas $SA_1$ and $SA_2$ are designed with the lower 2.4 GHz frequency band as that is the worst-case scenario and results in the largest separation value and highest antenna isolation. The individual antenna lengths are shown in FIG. 9 as $LA_{1(5\ GHz)}$ (950), $LA_{1(2.4\ GHz)}$ (960), $LA_{2(5\ GHz)}$ (970), $LA_{2(2.4\ GHz)}$ (980), and $LA_{3(2.4\ GHz)}$ (990).

Figure 10:
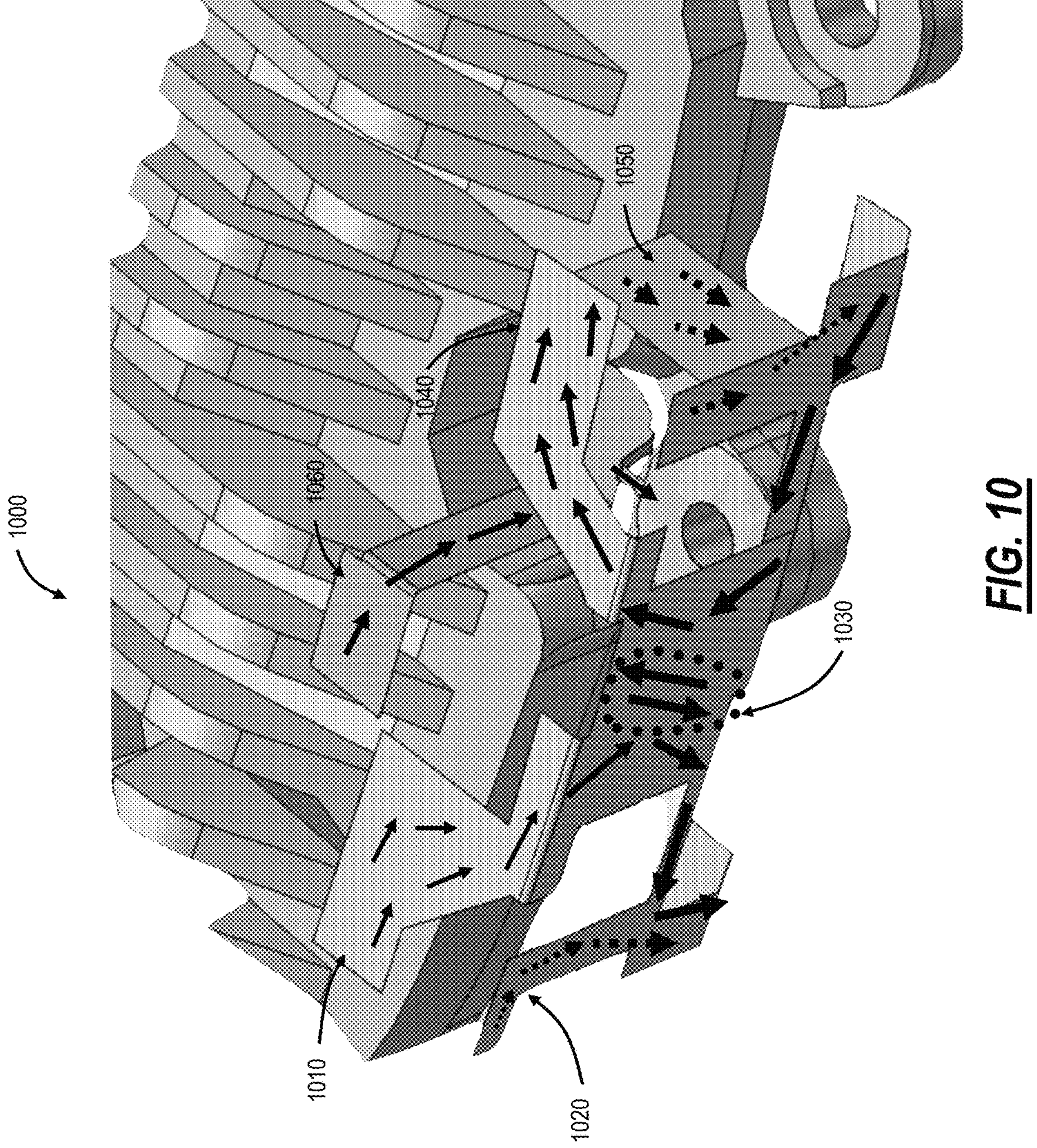
FIG. 10 depicts the common short pin IFA/PIFA antenna configuration illustrating the direction of currents flowing along the antennas.

Current Distributions for Common Short Pin Design for Multiple IFA/PIFA Antennas FIG. 10 is the common short pin IFA/PIFA antenna configuration illustrating the direction of currents flowing along the antennas A1, A2, and A3 with separation criteria implemented. The currents flowing along the antennas are represented by solid arrows for the 2.4 GHz currents and dashed arrows for the 5 GHz currents. Antenna A1 which includes 2.4 GHz radiating element 1010 as well as 5 GHz radiating element 1020 show currents flowing from the radiating elements to the short pin 1030. Similarly, Antenna A2 which includes 2.4 GHz radiating element 1040 as well as 5 GHz radiating element 1050 show currents flowing from the radiating elements to the short pin 1030. Antenna A3 1060 operates at 2.4 GHz and the currents from the A3 radiating element to the common short pin are shown flowing near the common short pin screw hole. It should be noted that the majority of the 5 GHz current flows on the outer antenna element as can be seen in the dashed arrow lines on 1020 and 1050. The currents shown were determined by simulation and as illustrated inside the dotted circle 1030 the currents in the short pin are in the opposite direction creating a differential mode current and resulting in the best isolation and thereby lowest coupling. The current flow in 1030 solves the problems that were described when the currents flow in the same direction as shown on the circuit diagram 420.

Figure 11:
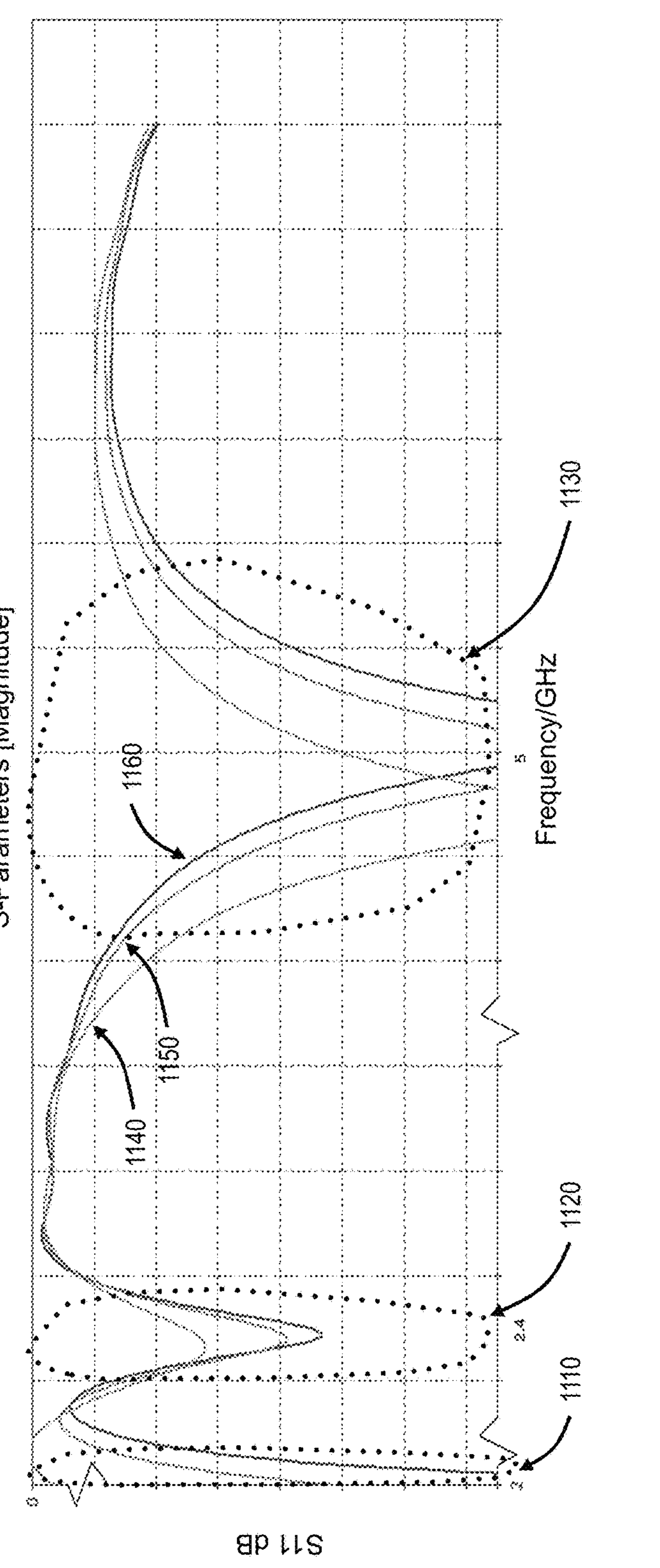
FIG. 11 is a frequency response graph for the common short pin IFA/PIFA antenna configuration and the S11 reflection.

FIG. 11 is a frequency response graph for the common short pin IFA/PIFA antenna configuration and the S11 reflection. This graph represents the antenna circuit shown in FIG. 9 and FIG. 10 implemented with the separations that enhance isolation, such as distance from center of the short pin to the antenna feeds A1, A2, and A3 equal to approximately $\lambda_d/8$ and the width of the short pin set at a minimum value of $\lambda_d/10$. The graph shown 1100 includes the three antennas A1 (1140), A2 (1150), and A3 (1160) as lines on the graph and their frequency response (S11 dB vs. frequency). The S11 dB on the Y axis represents how much power is reflected from the antenna to the antenna feed and is known as the reflection coefficient and is represented in negative dB (decibels). S11 is the power reflected from the antenna back to the same antenna. Low S11 is desired as it means that power delivered by the antenna feed is minimally reflected by the antenna (most power is accepted by the antenna). It can also be noted that the responses for the three antennas are similar at the different frequencies as these antennas are designed to operate simultaneously at the same frequencies representing a 3×3 MIMO. The area in the dotted circle 1110 represents the response where the currents in the short pin flow in the same direction 420 and create common mode currents which represent a more positive dB closer or above the zero Y-axis point. It can be noted that in this frequency band in the dotted circle 1110 the common mode currents that exist are tuned below the 2.4 GHz band (around 2 GHz) and out of the 2.4 GHz band of interest. Since the coupling occurs out of the frequency band of operation it will not affect the antenna operation. At the 2.4 GHz frequency area of the graph 1120 the Y-axis dB is much below the 0 axis and represents a negative dB number which represents a very good isolation. The negative dB is due to the currents in the short pin operating in the opposite direction (differential mode currents) as illustrated in 1030. At the 5 GHz frequency area of the graph 1130 the isolation is also very good as the currents in the short pin operate in the opposite direction as well. The frequency response in 1100 prove that the antenna design criteria result in low coupling (high isolation) at the intended operating frequency of 2.4 GHz and 5 GHz.

Figure 12:
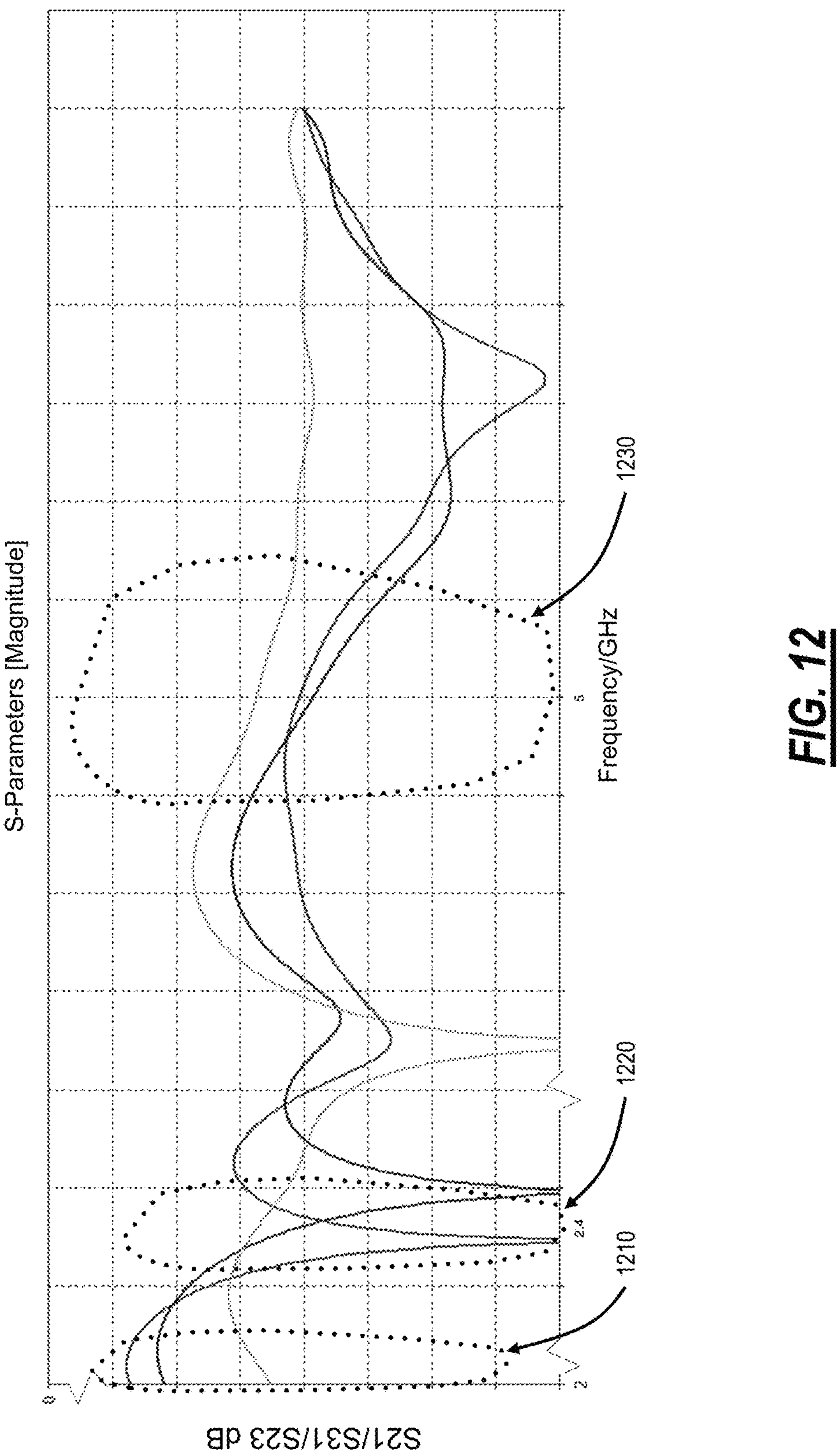
FIG. 12 is a frequency response graph for the common short pin IFA/PIFA antenna configuration and the S21, S31, S23 isolations.

FIG. 12 is a frequency response graph for the common short pin IFA/PIFA antenna configuration and the S21, S31, S23 isolations. The antenna tunings are shown in 1200 with the Y-axis representing the power leaking from one antenna into the other wherein S21 is between antenna 1 and antenna 2, S31 is between antenna 3 and antenna 1, and S23 is between antenna 2 and antenna 3. The Y-axis scale is in −dB where the lower number the lower the coupling between the antennas. A low S21, S31, S23 value is desired as it means that there is minimal power leaking from one antenna to another. As shown in dotted circle area 1210 the lines that represent the antennas have a higher dB value approaching the 0 dB value which represent a high coupling. This is a result of the currents that are flowing from the antennas A1, A2, A3 traveling in the same direction on the common short pin (shown on the circuit diagram 420). These common mode currents are not desired and would result in unwanted coupling, however they are operating in the 2 GHz and lower frequency band (X-axis) therefore they are outside the band of operation that the antenna would be operating at (2.4 GHz and 5 GHz). At the 2.4 GHz band 1220 the dB value is much lower and represents an acceptable −dB which is a result of the currents flowing in the opposite direction on the short pin. Similarly, at the 5 GHz band 1230 the currents flow in the opposite direction also and result in low coupling. The frequency response in 1200 prove that the antenna design criteria result in low coupling (high isolation) at the intended operating frequency of 2.4 GHz and 5 GHz.

Zero Distance Short Pin Design for Multiple IFA/PIFA Antennas

Figure 13:
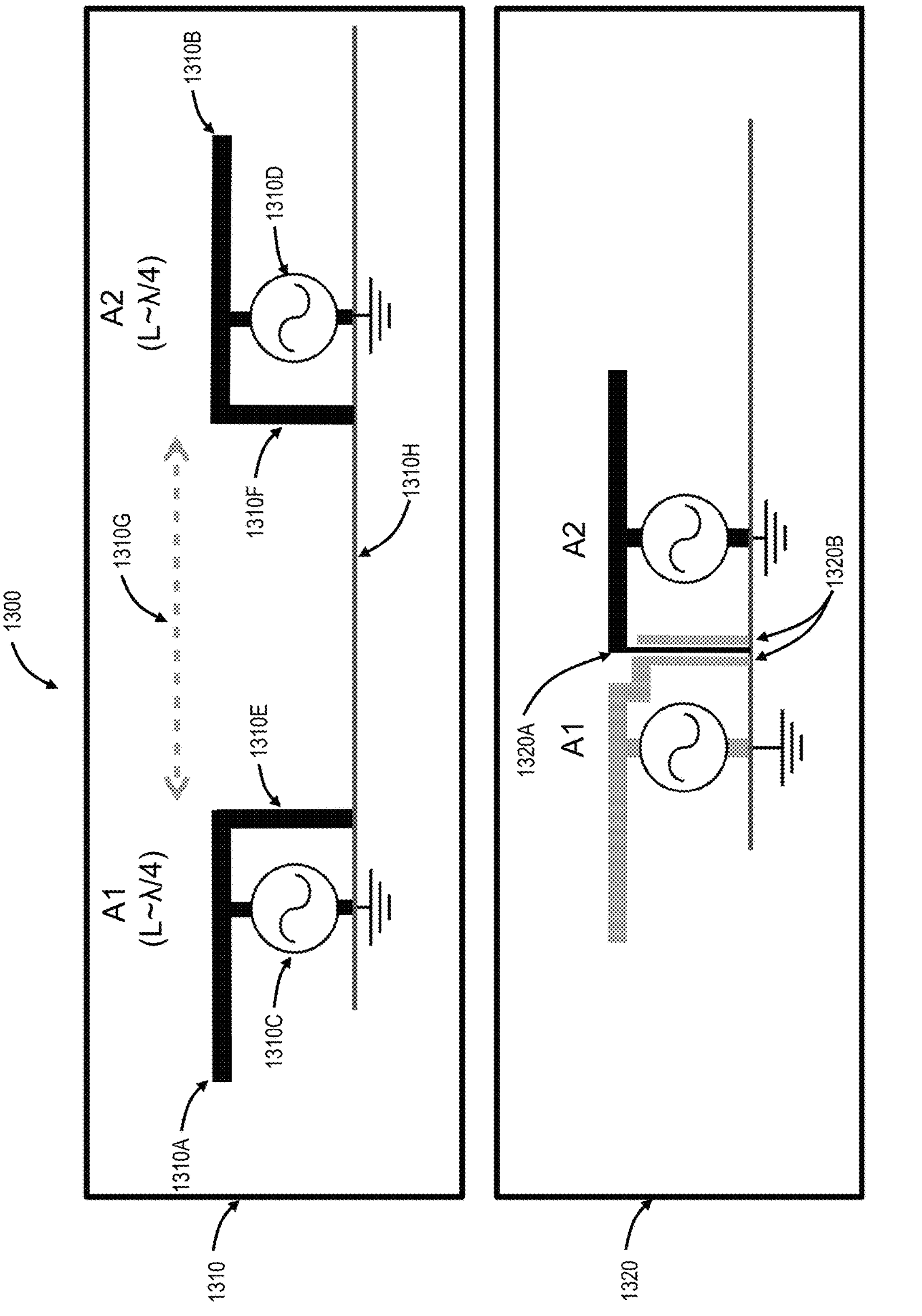
FIG. 13 is a circuit diagram of a multiple IFA/PIFA circuit with a zero distance short pin including enhancements to reduce coupling.

FIG. 13 is a circuit diagram of a multiple IFA/PIFA circuit with a zero distance short pin including enhancements to reduce coupling. Two traditional IFA/PIFA antennas (Antenna A1 and Antenna A2) are shown with radiating elements (1310A, 1310B), antenna feeds (1310C, 1310D), and a ground plane 1310H. The short pin for antenna A1 1310E and the short pin for antenna A2 1310F is used as a shunt inductance to counteract the parasitic capacitance (shunt capacitance) that is formed between the antenna radiating elements (1310A, 1310B) and the ground plane (1310H). The short pins can be implemented into the antenna as a conductor, a screw, a copper tape, a PCB trace, etc. The circuit diagrams shown in 1310 are an example of a traditional multi-antenna design that can be described in more detail as consisting of multiple IFA/PIFA antennas where the antennas have λ/4 length and includes a common ground plane where the ground plane acts to reflect the radio waves and represent a resonant circuit.

The antenna separation 1310G can be modified to reduce coupling between the antennas, typically, the multiple antennas need to have an antenna separation of approximately λ/2 to provide sufficient high isolation and low coupling. The novel approach in the disclosed of reducing the antenna separation and taking up less volume inside the small form wireless device is shown in the circuit diagram 1320 wherein the short pin for antenna A1 (1320B) is formed into a cylindrical shape and the antenna A2 short pin (1320A) is fed through the cylinder without being in physical contact with the antenna A1 short pin 1320B. By having the short pins being electrically isolated but in the same location this configuration would allow the short pins to be in the same location but also have low coupling and high isolation as even if the currents flow in the same direction common mode currents would not exist. There are no Direct Current (DC) connections between the short pins so currents on each short pin are electrically isolated from one another.

The individual antennas A1 and A2 can be operating simultaneously at the same frequency such as at the 2.4 GHz band but can also be operating simultaneously at different frequencies such as a combination of 2.4 GHz and 5 GHz, 2.4 GHz and 6 GHz, or 5 GHz and 6 GHz, for example. The antennas may be operating on the same frequency band but at different frequencies such as one antenna operating with Bluetooth, a second antenna operating with Matter, and a third with Wi-Fi.

Figure 14:
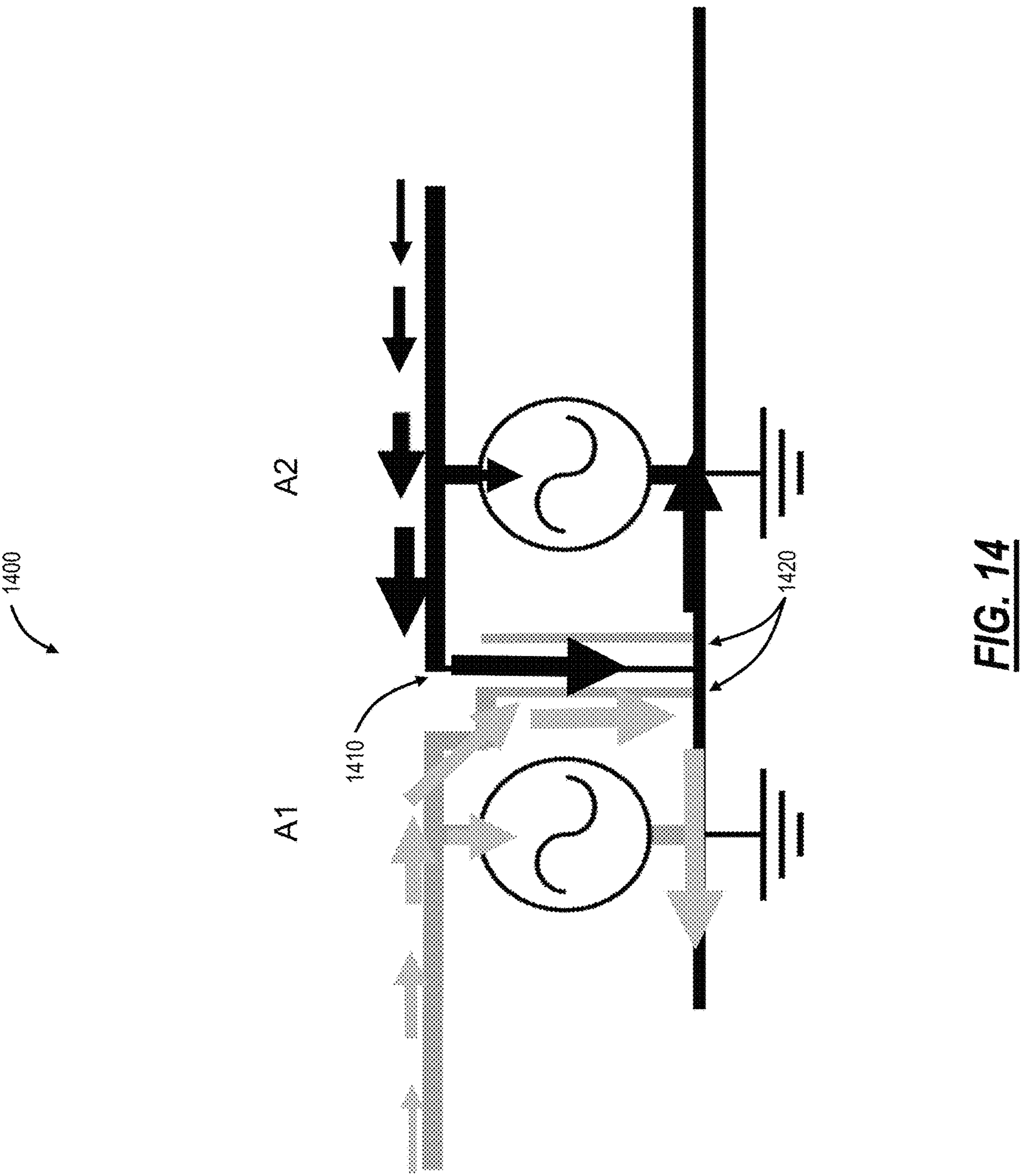
FIG. 14 depicts a circuit diagram illustrating current flow along the zero distance short pin IFA/PIFA circuit.

Current Distributions for the Zero Distance Short Pin for Multiple IFA/PIFA Antennas FIG. 14 depicts how current flows along the zero-distance short pin IFA/PIFA circuit. As shown the currents on antenna A1 flow from the radiating element down to the short pin 1420 and to the ground plane. The currents on antenna A2 flow from the radiating element down to the short pin 1410 which is located inside the antenna A1 cylindrical short pin 1420. The currents on each of the short pins (1410 and 1420) flow in the same direction which as described in the common short pin design (420) would create common mode currents and increase coupling (reducing isolation). However, since the short pins are electrically and physically isolated from one another common mode current coupling is minimized.

Figure 15:
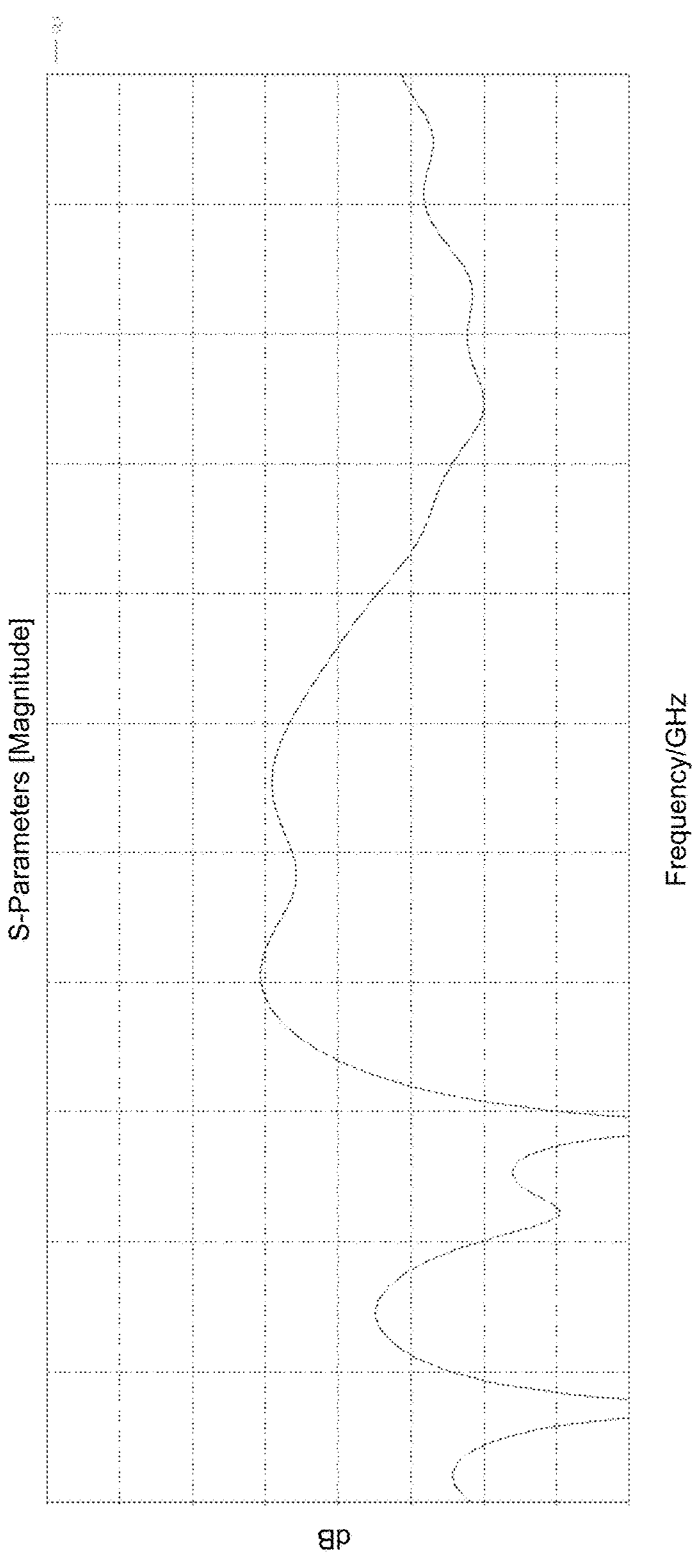
FIG. 15 is a frequency response graph for the zero distance short pin IFA/PIFA antenna configuration and the S21 isolation.

FIG. 15 is a frequency response graph showing isolations for the antennas A1 and A2. The antenna tunings are shown in 1500 with the Y-axis representing the power leaking from one antenna into the other wherein S21 is between antenna 1 and antenna 2, or antenna A1 and antenna A2 as shown on FIG. 13 and FIG. 14. The Y-axis scale is −dB where the lower dB number the lower the coupling between the antennas. A low S21 value is desired as it means that there is minimal power leaking from one antenna to another. These antennas are designed to operate at 2.4 GHz, 5 GHz, and/or 6 GHz wherein the dB level is lower at those frequencies and the graph 1500 shows good isolation at each of those operating frequencies. This zero distance short pin design can be designed for any combination of 2.4 GHz, 5 GHz, and 6 GHz operating frequencies operating simultaneously including both the antennas operating at the similar frequency bands.

Implementation of the Zero Distance Short Pin for Multiple IFA/PIFA Antennas

Figure 16:
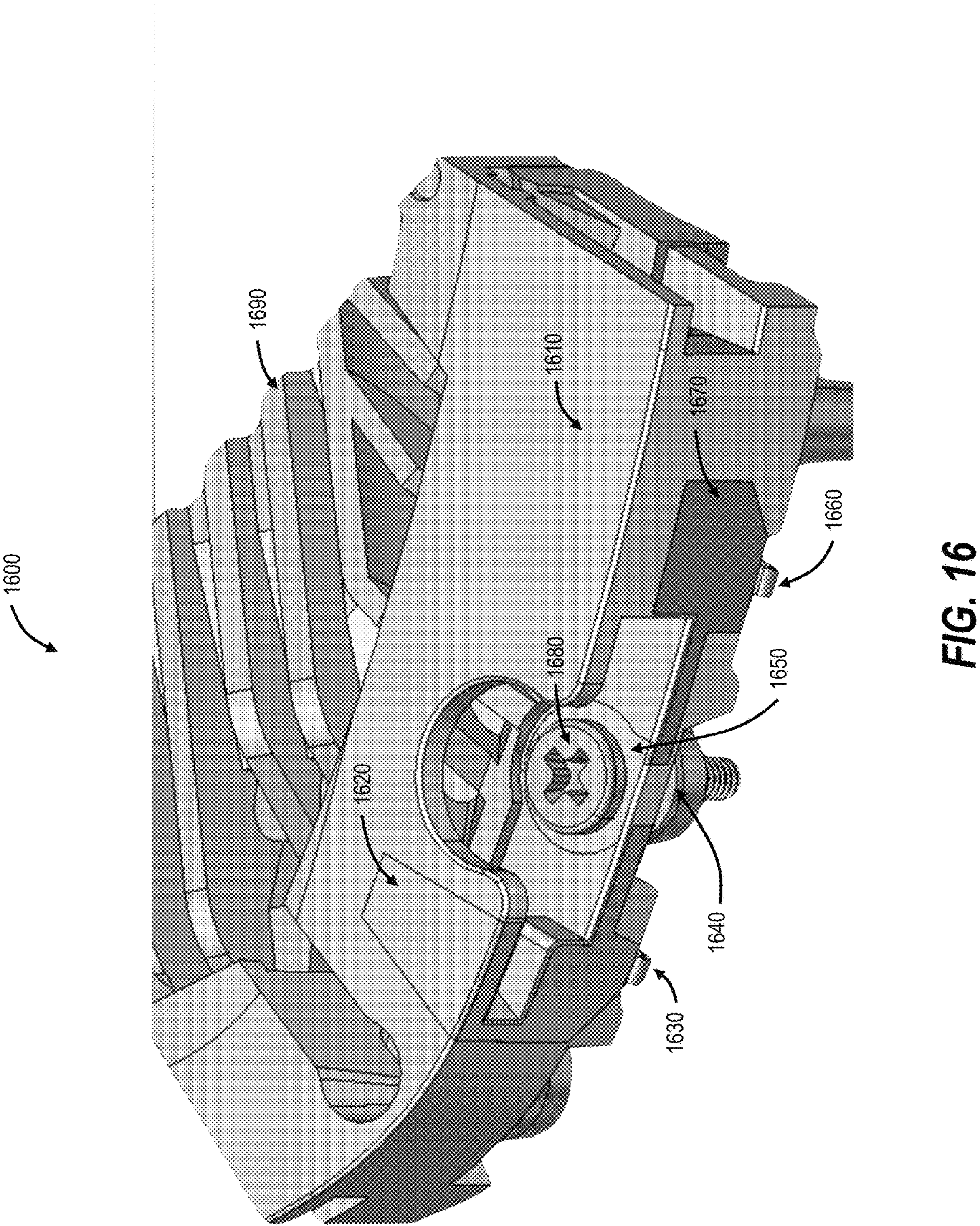
FIG. 16 is an illustration depicting the zero distance short pin IFA/PIFA antenna with dielectric carrier implementation.

FIG. 16 is an illustration depicting the zero-distance short pin IFA/PIFA antenna with dielectric carrier implemented. Antenna A1 and Antenna A2 are printed with Laser Direct Structuring (LDS) technology fixed on the dielectric carrier 1610. Antenna A1 element 1620 and Antenna A2 element 1670 are shown with the corresponding antenna feeds on the bottom of the antenna arrangement wherein the antenna feeds connect the antenna to the RF PCB (Antenna A1 feed 1630, Antenna A2 feed 1660). The dielectric carrier attaches to a metallic heat sink 1690. Antenna A1 short pin as shown in the circuit diagram in FIG. 13 as 1320B is shown in this illustration as element 1640 wherein the short pin takes a cylindrical shape located below the screw boss and the screw boss acts as the ground connection. Antenna A2 short pin as shown in the circuit diagram in FIG. 13 (1320A) is shown in this illustration as element 1650 which is formed by the metallic screw head 1680 wherein the screw is grounded to the mid spreader which is the heatsink below the RF PCB. The Antenna A1 short pin 1640 and Antenna A2 short pin 1650 are not in contact with one another as a dielectric material is included around the two short pins to provide electrical isolation.

Figure 17:
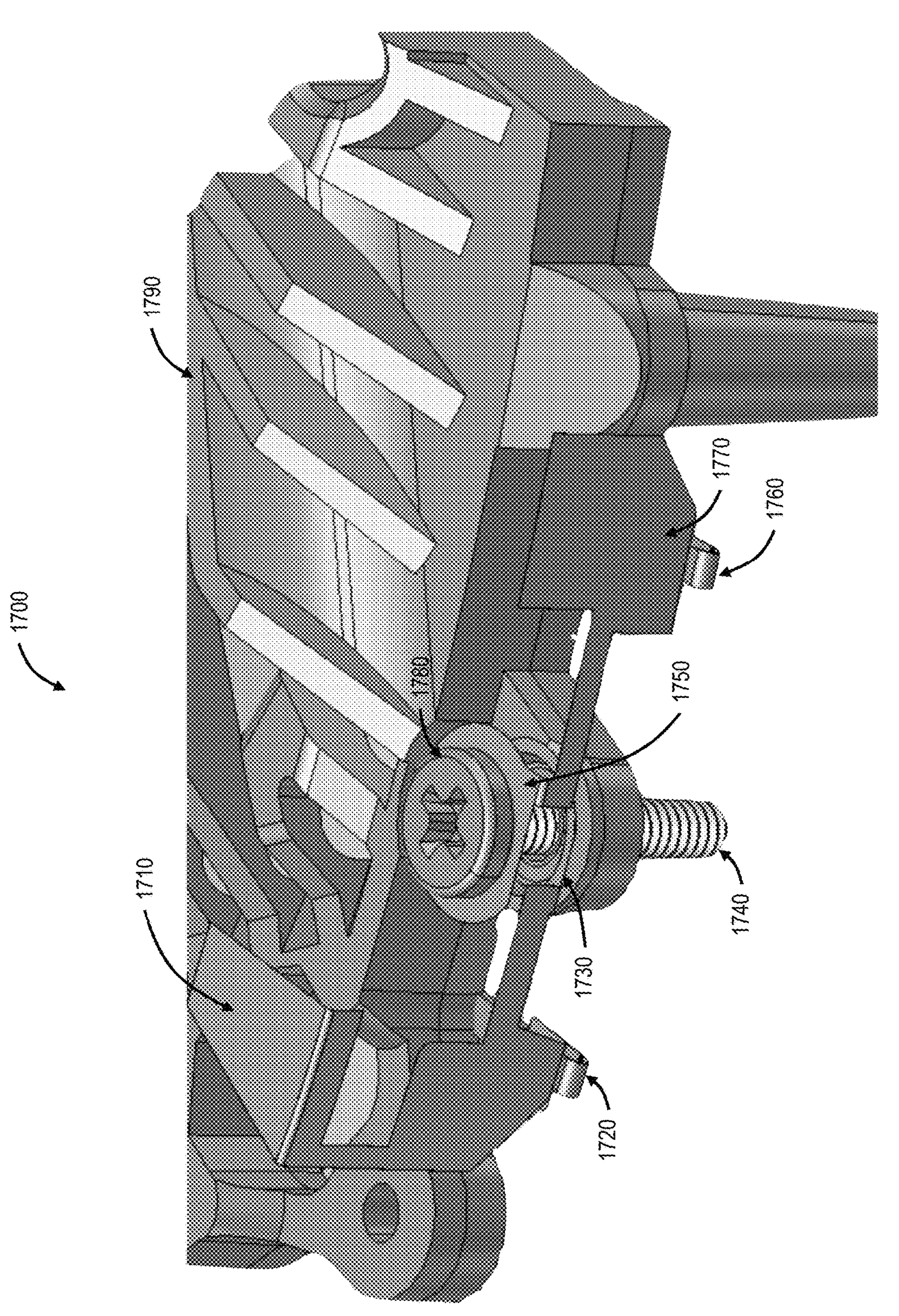
FIG. 17 is an illustration depicting the zero distance short pin IFA/PIFA antenna with the dielectric carrier omitted.

FIG. 17 is an illustration depicting the zero distance short pin IFA/PIFA antenna with dielectric carrier omitted. Omitting the dielectric carrier which serves as separation between the antenna arrangement and the heat sink 1790 the arrangement of the Antenna A1 short pin 1730 and the Antenna A2 short pin 1750 can be better shown. The Antenna A1 radiating element 1710 and the antenna A1 feed 1720 are further shown and the antenna A1 short pin connection to the antenna 1730 is shown where the short pin forms a cylinder around the ground screw 1740. 1700 depicts the implementation for the zero distance short pin arrangement represented by the circuit diagram shown in 1320. Antenna A2 radiating element 1770 and the Antenna A2 feed 1760 are further shown and the antenna A2 short pin 1750 is shown in contact with the ground screw head 1780. The ground screw 1740 acts as the A2 short pin conductor being fed through the A1 short pin cylindrical shape 1730. The Antenna short pins 1730,1750 are isolated by the screw boss which includes a dielectric to maintain direct current isolation.

Figure 18:
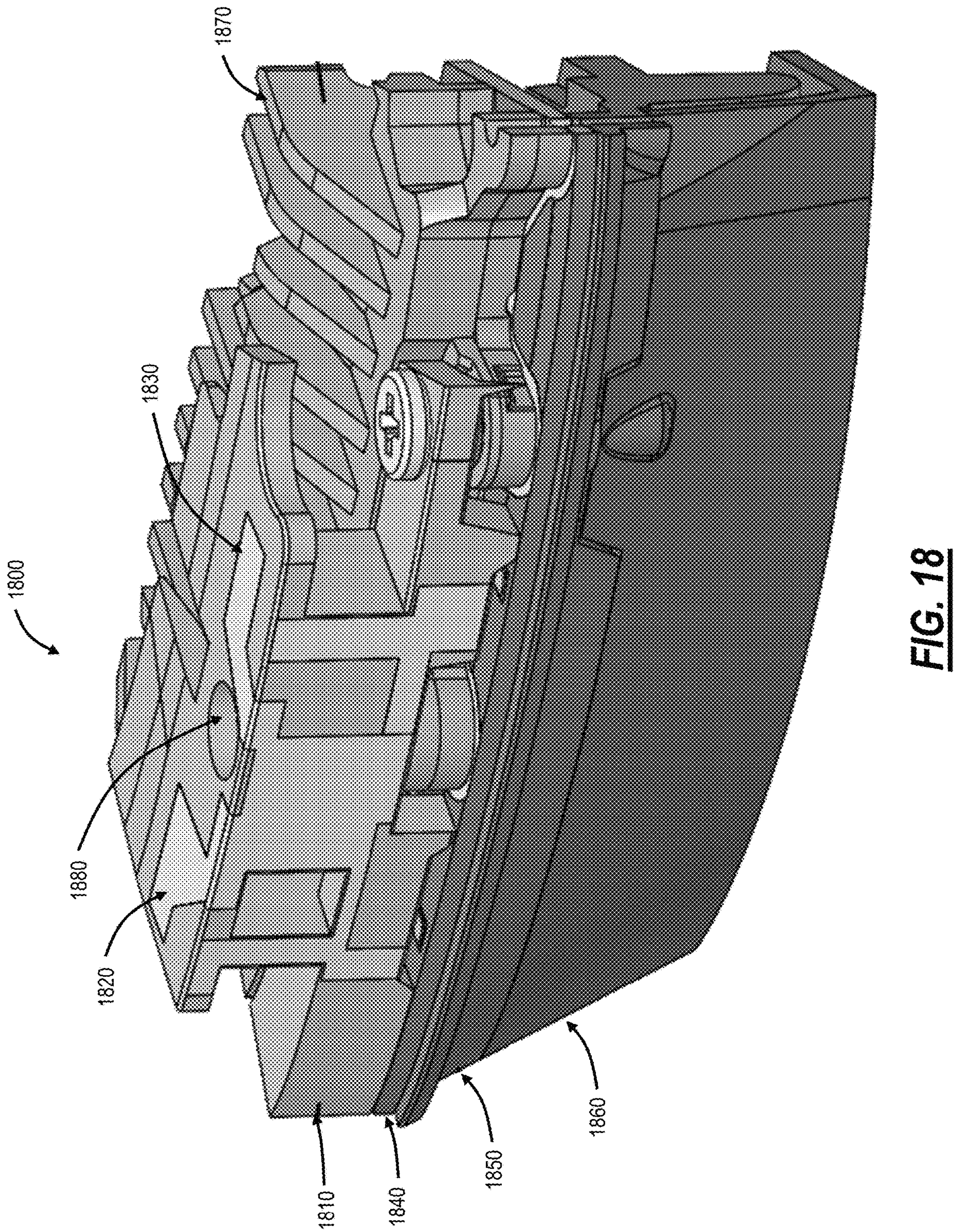
FIG. 18 is an illustration depicting the zero distance short pin IFA/PIFA antenna being implemented on a wireless device base.

FIG. 18 is an illustration depicting the zero distance short pin IFA/PIFA antenna being implemented on the wireless device base. The dielectric carrier 1810 is shown with Antenna A1 (1820) and Antenna A2 (1830) being implemented with LDS technology. The ground screw that is used as the Antenna A2 short pin is not shown in this view but the screw hole 1880 is shown. The wireless device includes the RF PCB 1840 which is mounted below the antenna arrangement where the antenna feeds connect. There also exists many heat sink/heat spreaders, the mid heat spreader 1850, bottom heat spreader 1860, and top heat spreader 1870. The heat spreaders and the RF PCB board are all options for grounding the short pins for Antenna A1 and Antenna A2 short pins.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. An antenna system comprising:

a plurality of antennas, each being one of an inverted-F antenna (IFA) type or a planar inverted-F antenna (PIFA) type;

wherein each of the plurality of antennas are associated with at least one short pin positioned between at least a portion of the plurality of antennas to minimize antenna separation between the plurality of antennas, the plurality of antennas share a same short pin, the same short pin being a planar conductive structure having a width of at least $\lambda/8$ and extending along a length between two or more of the plurality of antennas, where $\lambda$ is based on a lowest frequency of operation of the antenna system, the planar conductive structure being configured to act as a distributed impedance element to reduce mutual coupling between the plurality of antennas while enabling an antenna-to-antenna spacing less than $\lambda/20$, wherein the width of at least $\lambda/8$ is selected based on the lowest frequency of operation of the antenna system such that the planar conductive structure provides distributed impedance that reduces mutual coupling between the plurality of antennas sharing the same short pin.

2. The antenna system of claim 1, wherein the same short pin has a width between at least two antennas of the plurality of antennas such that the same short pin physically bridges the at least two antennas to reduce mutual coupling therebetween.

3. The antenna system of claim 1, wherein the lowest frequency of operation is about 2.4 GHz.

4. The antenna system of claim 1, wherein the same short pin includes a minimum distance to associated antenna feeds of the plurality of antennas.

5. The antenna system of claim 4, wherein the minimum distance is about at least λ/10 where λ is based on a lowest frequency of operation of the antenna system.

6. The antenna system of claim 1, wherein the same short pin has a width between at least two antennas and a minimum distance to associated antenna feeds of the plurality of antennas, such that the width and the minimum distance are based on λ that is based on a lowest frequency of operation of the antenna system.

7. The antenna system of claim 6, wherein the plurality of antennas are on a dielectric carrier and λ is adjusted based thereon.

8. The antenna system of claim 7, wherein the dielectric carrier is located on a heatsink of an electronic device.

9. The antenna system of claim 1, wherein the plurality of antennas include three antennas, A1, A2, and A3, each sharing the same short pin.

10. The antenna system of claim 9, wherein the same short pin has a width between A1, A2 and a minimum distance to associated antenna feeds of the plurality of antennas, such that the width and the minimum distance are based on λ that is based on a lowest frequency of operation of the antenna system.

11. The antenna system of claim 1, wherein the same short pin is grounded to one of a printed circuit board (PCB) ground and a heatsink via a screw.

12. The antenna system of claim 1, wherein the at least one short pin comprises different short pins located together, the different short pins include a first short pin as a cylinder and a second short pin located within the cylinder without contact therebetween.

13. The antenna system of claim 12, wherein the cylinder is a screw boss and the second short pin includes screw threads of a screw that does not connect to the screw boss.

14. The antenna system of claim 1, wherein the plurality of antennas support any of 2.4 GHz, 5 GHz, and 6 GHz operation, wherein the any of 2.4 GHz, 5 GHz, and 6 GHz operation is multiple input-multiple output (MIMO).

15. The antenna system of claim 1, wherein one or more of the plurality of antennas include effective lengths supporting two or more frequency bands.

16. A method comprising:

providing a plurality of antennas, each being one of an inverted-F antenna (IFA) type or a planar inverted-F antenna (PIFA) type; and providing at least one short pin for the plurality of antennas positioned between at least a portion of the plurality of antennas to minimize antenna separation between the plurality of antennas, the plurality of antennas share a same short pin, the same short pin being a planar conductive structure having a width of at least λ/8 and extending along a length between two or more of the plurality of antennas, where λ is based on a lowest frequency of operation of the plurality of antennas, the planar conductive structure being configured to act as a distributed impedance element to reduce mutual coupling between the plurality of antennas while enabling an antenna-to-antenna spacing less than λ/20, wherein the width of at least λ/8 is selected based on the lowest frequency of operation of the antenna system such that the planar conductive structure provides distributed impedance that reduces mutual coupling between the plurality of antennas sharing the same short pin.

17. A compact electronic device comprising:

a compact housing;

circuitry in the compact housing; and a plurality of antennas communicatively coupled to the circuitry, each being one of an inverted-F antenna (IFA) type or a planar inverted-F antenna (PIFA) type;

wherein each of the plurality of antennas are associated with at least one short pin positioned between at least a portion of the plurality of antennas to minimize antenna separation between the plurality of antennas in the compact housing, the plurality of antennas share a same short pin, the same short pin being a planar conductive structure having a width of at least λ/8 and extending along a length between two or more of the plurality of antennas, where λ is based on a lowest frequency of operation of the plurality of antennas, the planar conductive structure being configured to act as a distributed impedance element to reduce mutual coupling between the plurality of antennas while enabling an antenna-to-antenna spacing less than λ/20, wherein the width of at least K/8 is selected based on the lowest frequency of operation of the plurality of antennas such that the planar conductive structure provides distributed impedance that reduces mutual coupling between the plurality of antennas sharing the same short pin.

18. The compact electronic device of claim 17, further comprising the at least one short pin comprising a set of different short pins.

* * * * *